(12) United States Patent
Wilder et al.

(10) Patent No.: US 9,365,434 B2
(45) Date of Patent: Jun. 14, 2016

(54) WATER FILTERING DEVICE

(75) Inventors: Haim Wilder, Raanana (IL); Eyal Krystal, Kfar Saba (IL); Shlomo Hillel, Modiin (IL); Hella Frenkel, Kfar Saba (IL); Stanislav Ratner, Zur Hadassa (IL)

(73) Assignee: STRAUSS WATER LTD., Petach Tikva (IL)

( * ) Notice: Subject to any disclaimer, the term of this patent is extended or adjusted under 35 U.S.C. 154(b) by 267 days.

(21) Appl. No.: 14/114,072

(22) PCT Filed: May 8, 2012

(86) PCT No.: PCT/IL2012/050160
§ 371 (c)(1),
(2), (4) Date: Oct. 25, 2013

(87) PCT Pub. No.: WO2012/153330
PCT Pub. Date: Nov. 15, 2012

(65) Prior Publication Data
US 2014/0048469 A1    Feb. 20, 2014

Related U.S. Application Data

(60) Provisional application No. 61/486,434, filed on May 16, 2011, provisional application No. 61/485,197, filed on May 12, 2011.

(51) Int. Cl.
*C02F 1/00* (2006.01)
*B01D 29/21* (2006.01)
*B01D 29/56* (2006.01)
*B01D 29/58* (2006.01)
(Continued)

(52) U.S. Cl.
CPC ............... *C02F 1/003* (2013.01); *B01D 29/21* (2013.01); *B01D 29/56* (2013.01); *B01D 29/58* (2013.01);
(Continued)

(58) Field of Classification Search
CPC .... B01D 24/007; B01D 24/18; B01D 24/183; B01D 27/146; B01D 29/56; B01D 29/58; B01D 35/301; B01D 35/303; B01D 36/02; B01D 2201/302; B01D 29/21; C02F 1/76; C02F 2201/007; C02F 1/003; C02F 1/42; C02F 1/68; C02F 1/281; C02F 1/283; C02F 2307/10
See application file for complete search history.

(56) References Cited

U.S. PATENT DOCUMENTS 2,966,990 A  *  1/1961  Sicard ................. B01D 29/114
                                                210/443
3,357,563 A  *  12/1967  Sicard ................... B01D 27/00
                                                210/209
(Continued)

FOREIGN PATENT DOCUMENTS

| CN | 2750852 | 1/2006 |
| CN | 201073570 | 6/2008 |

(Continued)

OTHER PUBLICATIONS

Machine translation of WO 92/16272 downloaded from the Espacenet website on Nov. 23, 2015, <URL: http://worldwide.espacenet.com/publication>, 17 pages.*

(Continued)

*Primary Examiner* — Matthew O Savage
(74) *Attorney, Agent, or Firm* — Morrison & Foerster LLP

(57) ABSTRACT

The invention relates to a filtering device for filtering running water from a pressurized water source, wherein two or more water treatment compartments or modules are arranged within a housing along a water flow path, each of the compartments or modules comprising at least one water treatment element or medium for performing a defined water treatment function.

15 Claims, 21 Drawing Sheets

(51) Int. Cl.
*B01D 35/30* (2006.01)
*C02F 1/28* (2006.01)
*B01D 24/18* (2006.01)
*C02F 1/42* (2006.01)
*C02F 1/68* (2006.01)
*C02F 1/76* (2006.01)

(52) U.S. Cl.
CPC .............. *B01D 35/303* (2013.01); *B01D 24/18* (2013.01); *B01D 2201/302* (2013.01); *C02F 1/281* (2013.01); *C02F 1/283* (2013.01); *C02F 1/42* (2013.01); *C02F 1/68* (2013.01); *C02F 1/76* (2013.01); *C02F 2201/007* (2013.01); *C02F 2307/10* (2013.01)

(56) References Cited

U.S. PATENT DOCUMENTS

| | | | | |
|---|---|---|---|---|
| 4,693,820 A * | 9/1987 | Baxter | ............... | B01D 23/14 210/232 |
| 5,897,770 A * | 4/1999 | Hatch | ............... | B01D 24/08 210/101 |
| 5,976,362 A | 11/1999 | Wadsworth et al. | | |
| 6,132,611 A | 10/2000 | Yuen | | |
| 6,962,660 B2 | 11/2005 | Wybo | | |
| 7,441,665 B2 | 10/2008 | Bridges et al. | | |
| 7,614,506 B2 | 11/2009 | Mitchell et al. | | |
| 2002/0104794 A1* | 8/2002 | Hoffmann | ............... | B01D 35/30 210/323.2 |
| 2004/0055939 A1 | 3/2004 | Wybo | | |
| 2005/0252844 A1 | 11/2005 | Chau | | |

FOREIGN PATENT DOCUMENTS

| | | | | |
|---|---|---|---|---|
| CN | 201423202 | | 3/2010 | |
| CN | 202654789 | | 1/2013 | |
| WO | WO 92/16272 | * | 10/1992 | ........... B01D 24/001 |
| WO | WO-2004/071961 | | 8/2004 | |
| WO | WO-2005/092798 | | 10/2005 | |

OTHER PUBLICATIONS

International Search Report and Written Opinion mailed Oct. 26, 2012, directed to International Application No. PCT/IL2012/050160; 15 pages.

* cited by examiner

WATER FILTERING DEVICE

REFERENCE TO RELATED APPLICATIONS

This application is a national stage application under 35 USC 371 of International Application No. PCT/IL2012/050160, filed May 8, 2012, which claims the priority of Provisional Application No. 61/485,197, filed May 12, 2011 and Provisional Application No. 61/486,434, filed May 16, 2011, the entire contents of which are incorporated herein by reference.

TECHNICAL FIELD

This invention relates to a water filtering device of the kind intended for filtering running water from a domestic water supply system or other sources of pressurized water, to obtain filtered or treated water, for example, of drinking water quality.

BACKGROUND

Filtering devices and methods for filtering liquids, particularly such for filtering water, are generally known. Examples are U.S. Pat. Nos. 5,976,362, 7,441,665, 7,614,506, WO 2004/071961 and WO 2005/092798. Such filtering devices hold a filtering medium with reactants that can remove harmful or otherwise undesired substances from the filtered water.

GENERAL DESCRIPTION

Provided herein is a filtering device for filtering running water supplied by a pressurized water source, such as, but not limited to, running water from a domestic water supply. The device may be used in water dispensing systems or devices, such as countertop or floor-standing water dispensing devices, in central water filtration systems and others. The filtering device may, by some embodiments, be disposable. The filter device provided herein may also, by some embodiments, be used as a stand-alone device, e.g. for use in a centralized water filtration system. The filtering device provided herein is compartmentalized, each compartment having the capability of performing a certain water treatment function. The water treatment function may, for example, be removal of a certain component from the water, disinfection, adding a certain component to the water and others. Components to remove may, for example, be particulate matter, organic substances (particularly organic contaminants), heavy metals, arsenic, certain salts, calcium, and others. Disinfection may comprise removal of bacteria or viruses. Adding components to the water may comprise adding substances of nutritional value, or may be adding a disinfectant such as bromine and others.

A filtering device of the kind provided herein may comprise compartments with various water treatment functions. The choice of treatment functions to be included may be made based on the specific properties and quality of the running water to be treated, on the basis of intended properties of the filtered water, based on regulatory requirements and many others. As will be appreciated the device provided herein is not limited to a certain combination of water treatment compartments.

The device of one embodiment may comprise a housing, having at least one running water inlet and at least one filtered water outlet, with a water flow path defined within the housing between the at least one inlet and the at least one outlet. The housing accommodates a plurality of water treatment compartments that are arranged in succession along the water flow path, each of which holds at least one water treatment element or medium for performing a water treatment function. A water treatment element may, for example, be: a porous filtering element such as a sheet of filtering material (e.g., paper, cloth, plastic, fiberglass and/or others), or may be a solid body of a filtering medium (e.g. porous mass of activated carbon) and others. A water treatment medium may, for example, be: ion-exchange resinous medium, particulate activated carbon medium, particulate matter that includes a substance to be released into the water (such substance may, for example, be disinfectant such as iodine, a substance of nutritious value such as vitamins, food supplements, caffeine, or various flavoring compounds); and in general a substance that interacts with the water to remove a certain substance from the water (e.g. through physical or chemical sorption) or to release a substance of nutritional, disinfectant or other value to the water. The water treatment element or medium will be referred to herein, is some sections, as "treatment medium/element" (and in plural as "treatment media/elements"). Said treatment medium/element may include such an element, such a medium or both. It should be noted that while some treatment media/elements may include a single component, for example homogeneous solid mass, e.g. a solid body of activated carbon, a single type of resin or a filter sheet, other treatment media/elements may include a combination of different components, for example a mixture of two different particulate treatment components such as a mixture of two different resins, a mixture of a resin and activated carbon particles and a resin, a combination of a physical filter element such as a filter sheet (e.g. filter paper) and active treatment components such as activated carbon or another substance that interacts with the water by removal (e.g. through physical or chemical sorption) of a substance from the water.

Each of the treatment compartments of said one embodiment has at least one water ingress and at least one water egress. The running water inlet is linked and in flow communication with the water ingress of a first treatment compartment, and the water egress of the last compartment is linked and in flow communication with the filtered water outlet. The arrangement in the filter is such that the water egress of each of the other compartments is linked and in flow communication with the water ingress of a succeeding compartment. In this way, a water flow path is defined between the running water inlet and the filtered water outlet through a succession of filtering compartments. In each compartment the water treatment function performed therein may be the same or different than that in other compartment, in dependence of the treatment medium/element included therein. Typically, while some compartments may perform the same treatment function as one or more other compartments, at least some perform different treatment functions than others, often a unique treatment function not performed by other compartments.

The water treatment function may be, as noted above, removal of a certain component from the water, disinfection, adding a certain component to the water and others.

The device typically includes 2, 3, occasionally 4, and at times more, water treatment compartments.

The filtering device comprises by some embodiments at least one type of water treatment compartment (to be referred to herein also as "direct flow WTC") that comprises a first treatment medium/element that may, for example, be in the form of a solid porous filtering mass, enveloping a lumen that defines an axis. The lumen may, for example, be defined by a void within a solid porous filtering mass or may be a lumen defined by perforated cylinder disposed within the compartment and surrounded by the first treatment medium/element.

Said first treatment medium/element is enveloped by an entry space linked and in flow communication with the compartment's water ingress. The lumen of said direct flow WTC is linked to the compartment's water egress. Thus, water flows in a generally radial direction (i.e. perpendicular to the axis) from said entry space to said lumen through said first treatment medium/element. Said lumen is typically substantially cylindrical and said first treatment medium is typically formed to have a substantially tubular configuration.

The compartment egress of the direct flow WTC may be coaxial with the axis defined by the lumen.

Said first treatment medium/element may, by some embodiments, be a treatment medium/element that can sorbs a substance out the water in combination with a physical filtering element that is adapted to filter out particles or elements above a defined size, such a filter sheet. For example, a solid porous filter body may be enveloped by a first sheet of porous matrix; for example, a sheet having the general form of a corrugated or pleated sleeve. Said first sheet may, for example, be made of paper, fiberglass, polymeric material or woven or non-woven cloth. Such a first sheet separates between the entry space and the first treatment medium, such that in order for the water to reach said first treatment medium from the entry space, it has to flow through said first sheet and against the flow resistance imposed thereby. This flow resistance thus works to spread the radial flow of the water more uniformly along the surface said first treatment medium/element. This sheet often also functions to remove particulate matter from the water.

At times, the lumen of the direct flow WTC comprises a second water treatment medium, which may be the same or different than said first treatment medium. The lumen may also comprise a second sheet of a porous matrix that lines the lumen's walls and, in case the lumen comprises a water treatment medium, enveloping it. Such a second sheet may be present in addition to or as an alternative to said first sheet. Said second sheet may also serve, at times, as a barrier between said first treatment medium and said second treatment medium. In addition to other potential functions, said second sheet may also have functions similar to those noted for said first sheet and may also have a corrugated or pleated structure.

By other embodiments of the direct flow WTC, the treatment medium/element is a physical filtering element such a filter sheet, for example a pleated filter sleeve.

The filtering device comprises by some embodiments at least one type of water compartment (to be referred to herein also as "serpentine flow WTC"), which has a water treatment space formed between two end walls opposite to one another and having a water ingress formed substantially at the center of a first of the two opposite walls. A curvilinear flow path is defined in the water treatment space by two or more concentric cylindrical wall sections, at least one of which extends into the treatment space from said first wall and at least one of which extends into the treatment space from the opposite wall. The treatment space contains at least one water treatment medium. Said serpentine flow compartment has, according to some embodiments, a generally cylindrical shape with a cylinder axis that extends between the two end walls and is perpendicular thereto.

Filtering devices of the invention may comprises one or more filtering compartments of the direct flow WTC, may comprise one or more filtering compartments of the serpentine flow WTC, may comprise both one or more direct flow WTC and one or more serpentine flow WTC. In addition to said direct flow WTC and/or serpentine flow WTC, the filtering device may also include other types of water treatment compartments. The filtering compartments may be arranged along the flow path in different arrangements of the different type of compartments and the disclosure herein is not limited to any specific arrangement or sequence.

The housing may be a single structural unit and may be prismatic, cylindrical, etc; or may comprise two or more sub-housing structures, each of which houses one or more water treatment compartments. In the latter case, one or more linking elements are provided that connect the sub-housing structures and having defined therein water conduits that permit water flow between the sub-housing structures along said flow path. Each of said sub-housing structures is typically an elongated element, e.g. substantially cylindrical.

For example, the filtering device may comprise two sub-housing structures, e.g. aligned with one another. The linking element is typically formed at an end, preferably a top end, of the sub-housing structures. The sub-housing structures are typically elongated, e.g. of a cylindrical or prismatic configuration and aligned with one another (namely the axes defined by each of the sub-housing structures are substantially parallel one to the other). The linking element is typically arranged in an orientation normal to said axes.

The running water inlet may be formed at one end of one sub-housing structure and the filtered water outlet may also be formed at an end of a sub-housing structure; for example, said inlet being formed at one end of one sub-housing structure and said outlet at an end of another sub-housing structure. It is also possible for one or both of the running water inlet and the filtered water outlet to be formed at said linking element.

The treatment compartment may be defined within water treatment modules that are disposed within the housing. There may be 2, 3, occasionally 4, and at times more of such water treatment modules. Said modules are typically pre-assembled, each being a stand-alone module, and inserted as such into the housing. The filtering device may house one or more direct flow water treatment modules ("WTM") having defined therein a direct flow WTC, serpentine flow WTM having define therein a serpentine flow WTC or other types.

The water egress of one or more of said modules may be defined within a projection adapted for being received into a matching depression formed in another component of the filter device, e.g. another water treatment module or a component that is in direct flow communication with the running water inlet or filtered water outlet, to thereby define a portion of the flow path. The water ingress of one or more of said modules may formed in a depression adapted to receive a matching projection of another component of the filter device, e.g. a matching projection of another of the modules or a component that is in direct flow communication with the running water inlet or filtered water outlet, to thereby defines a portion of the flow path.

By an embodiment of the disclosure herein, the filtering device comprises at least one enveloping compartment, having a general annular shape formed about an axis that envelopes at least one enveloped compartment which is, thus, situated within a space defined by the enveloping compartment. The at least one enveloping compartment and the at least one enveloped compartment are typically concentric. By one embodiment the enveloping compartment has a filtering medium or element defined between external and internal faces thereof and the water flows in a substantially radial direction from said external to said internal face. The enveloping compartment may be formed with an entry space enveloping the water treatment medium or element and a water collecting space enveloped by the water treatment medium or element. The water collecting space is linked to a water egress which is in flow communication with the water ingress of the enveloped compartment. The filter of the embodiments described in this paragraph may also include one or more end compartments situated between the enveloping and the enveloped compartments and one of the ends of the filtering device; the ends being defined by said axis that extends therebetween. The treatment medium or element in the end compartment may be formed with a cavity and the water ingress of the end compartments opens into said cavity; whereby the water flows therefore through the water treatment medium or element of the end compartment.

EMBODIMENTS

Some of the novel features of the current disclosure are defined in the following numbered embodiments. It is to be noted that these numbered embodiments intend to add on and not limit the disclosure herein in the above General Description and in the Detailed Description of Embodiments, below.

1. A filtering device for filtering running water from a pressurized water source, comprising:
    a housing with at least one running water inlet and at least one filtered water outlet with a water flow path defined within the housing between the at least one inlet and at least one outlet;
    two or more water treatment compartments within the housing arranged in succession along the water flow path, each of which has a water treatment space with at least one water treatment medium or element for performing a defined water treatment function, and each having at least one water ingress and at least one water egress; the running water inlet being linked and in flow communication with the water ingress of a first compartment, the water egress of a last compartment being linked and in flow communication with the filtered water outlet, the water egress of each of the other compartments being linked and in flow communication with the water ingress of a succeeding compartment; and preferably comprising also
    at least one of the compartments (i) has a curvilinear flow path being defined in its water treatment space by two or more concentric cylindrical wall sections, at least one of which extends into the treatment space from said first wall and at least one of which extends into the treatment space from the opposite wall, or (ii) has a corrugated or pleated filter sheet enveloping or being enveloped by another treatment medium or element.

2. The filtering device of embodiment 1, comprising a succession of 2 or more water treatment compartments.

3. The filtering device of embodiment 2, comprising a succession 3 or 4 water treatment compartments.

4. The filtering device of any one of embodiments 1-3, wherein the water treatment medium or element is one or more of the groups consisting of a porous filtering element such as a sheet of filtering material (e.g., paper, cloth, plastic, fiberglass and/or others), a solid body of a filtering medium (e.g. porous mass of activated carbon), an ion-exchange resinous medium, particulate activated carbon medium, particulate matter that includes a substance to be released into the water (e.g. a disinfectant such as iodine, a substance of nutritious value such as vitamins, food supplements, caffeine, or various flavoring compounds).

5. The filtering device of any one of embodiments 1-4, wherein the treatment media or elements comprises: (i) a single component, for example homogeneous solid mass, e.g. a solid body of activated carbon, a single type of resin or a filter sheet; or (ii) a combination of different components, for example a mixture of two different particulate treatment components such as a mixture of two different resins, a mixture of a resin and activated carbon particles and a resin, a combination of a physical filter element such as a filter sheet (e.g. filter paper) and active treatment components, such as activated carbon or another substance that interacts with the water by removal (e.g. through physical or chemical sorption) of a substance from the water.

6. The filtering device of any one of embodiments 1-5, wherein a defined water treatment function is being performed by more than one compartment.

7. The filtering device of any one of embodiments 1-5, comprising compartments that perform a unique water treatment function.

8. The filtering device of any one of embodiments 1-7, wherein
    at least one direct flow water treatment compartment comprises a first water treatment medium or element enveloping a lumen, the lumen defining an axis;
    the first treatment medium or element being enveloped by an entry space linked and in flow communication with the compartment's water ingress; and
    the lumen being linked to the compartment's water egress; whereupon water flows in a general radial direction from said entry space to said lumen through said first treatment medium or element.

9. The filtering device of embodiment 8, wherein the treatment medium or element is a solid porous filtering body.

10. The filtering device of embodiment 8 or 9, wherein said lumen is substantially cylindrical.

11. The filtering device of any one of embodiments 8-10, wherein the lumen is defined by a void within a solid porous filtering mass.

12. The filtering device of any one of embodiments 8-10, wherein the lumen is defined by a perforated cylinder disposed within the compartment and surrounded by the treatment medium or element.

13. The filtering device of any one of embodiments 8-12, wherein said treatment medium or element is substantially of tubular form.

14. The filtering device of any one of embodiments 8-13, wherein the compartment egress is coaxial with said axis.

15. The filtering device of any one of embodiments 8-14, wherein said treatment medium or element is enveloped by a first sheet of porous matrix.

16. The filtering device of any one of embodiments 8-15, wherein the inner wall of said lumen is lined by a second sheet of a porous matrix.

17. The filtering device of embodiment 15 or 16, wherein said sheet has the general form of a corrugated or pleated sleeve.

18. The filtering device of embodiment 15 or 16, wherein said sheet improves uniformity of radial water flow from the entry space to the lumen along said treatment medium or element, as compared to such flow without said sheet.

19. The filtering device of any one of embodiments 8-18, wherein said lumen comprises a second water treatment medium or element which may be of the same or different substance(s) than that of said first water treatment medium or element.

20. The filtering device of any one of embodiments 8-14, wherein the treatment medium or element is a physical filtering medium or element.

21. The filtering device of embodiment 20, wherein the filtering medium or element is a corrugated or pleated filter sheet.

22. The filtering device of any one of embodiments, 1-21 wherein the water treatment medium in at least one compartment comprises activated carbon.

23. The filtering device of any one of embodiments 1-22, wherein
- at least one serpentine flow type water treatment compartment has a water treatment space formed between two end walls opposite to one another and having a water ingress formed at substantially the center of a first of the two opposite walls;
- a curvilinear flow path being defined in the water treatment space by two or more concentric cylindrical wall sections, at least one of which extends into the treatment space from said first wall and at least one of which extends into the treatment space from the opposite wall; and
- said treatment space containing at least one water treatment medium.

24. The filtering device of embodiment 23, wherein said serpentine flow compartment has a generally cylindrical shape with a cylinder axis extending between the two end walls and perpendicular thereto.

25. The filtering device of any one of embodiments 1-24, wherein the housing comprises
- two or more sub-housing structures, each of which houses one or more water treatment compartments; and
- one or more linking elements connecting the sub-housing structures and having water conduits defined therein to permit water flow between said sub-housing structures along said flow path.

26. The filtering device of embodiment 25, wherein each of said sub-housing structures is an elongated element.

27. The filtering device of embodiment 26, wherein the sub-housing structures are substantially cylindrical.

28. The filtering device of embodiment 26 or 27, comprising two sub-housing structures aligned with one another with the linking element being in normal orientation to that of said sub-housing structures.

29. The filtering device of embodiment 28, wherein the running water inlet and the filtered water outlet or formed within the linking element.

30. The filtering device of embodiment 29, wherein the linking element is formed at a top end of the housing.

31. The filtering device of any one of embodiments 1-24, wherein at least one enveloping compartment, having a general annular shape formed about an axis envelopes at least one enveloped compartment.

32. The filtering device of any one of embodiments 1-24, comprising at least two concentric compartments, at least one of which is an enveloping compartment enveloping at least one other enveloped compartment.

33. The filtering device of embodiment 31 or 32, wherein the enveloping compartment has a filtering medium or element defined between external and internal faces thereof and the water flows in a substantially radial direction from said external to said internal face.

34. The filtering device of embodiment 33, wherein the enveloping compartment is formed with an entry space enveloping the water treatment medium or element and a water collecting space enveloped by the water treatment medium or element.

35. The filtering device of embodiment 34, wherein the enveloped compartments has a water ingress linked to and in flow communication with the water collecting space.

36. The filtering device of any one of embodiments 31-35, wherein said axis extends between a first and a second end of the filter, and comprising at least one end compartment situated between the at least one enveloping and the at least one enveloped compartments and one of the ends.

37. The filtering device of embodiment 36, comprising a conduit linking the water egress of one of the enveloping or enveloped compartments and the water ingress of the end compartment; said end compartment comprising a treatment medium or element formed with a cavity and said water ingress opens into said cavity.

38. The filtering device of embodiment 37, wherein the water inlet is linked to said entry space and the water outlet is linked to the water egress of the end compartment.

39. A filtering device for filtering running water from a pressurized water source, comprising:
- a housing with at least one running water inlet and at least one filtered water outlet;
- two or more water treatment modules disposed within the housing, each of which defines a water treatment space that holds at least one water treatment medium for either removing a component from or adding a component to the water, and having a water ingress and a water egress; the running water inlet being linked and in flow communication with the water ingress of a first water treatment module, the water egress of a last water treatment module being linked and in flow communication with the filtered water outlet, the water egress of each of the other compartments being linked and in flow communication with the water ingress of a succeeding compartment, to thereby define a water flow path from the water inlet to the water outlet through a succession of the water treatment modules; and preferably comprising also
- at least one of the modules (i) defines a curvilinear flow path its water treatment space by two or more concentric cylindrical wall sections, at least one of which extends into the treatment space from said first wall and at least one of which extends into the treatment space from the opposite wall, or (ii) comprises a corrugated or pleated filter sheet enveloping or being enveloped by another treatment medium or element.

40. The filtering device of embodiment 39, comprising a succession of at least 3 water treatment modules.

41. The filtering device of embodiment 40, comprising a succession of 4 water treatment modules.

42. The filtering device of any one of embodiments 39-41, wherein the water treatment medium or element is one or more of the group consisting of a porous filtering element such as a sheet of filtering material (e.g., paper, cloth, plastic, fiberglass and/or others), a solid body of a filtering medium (e.g. porous mass of activated carbon), an ion-exchange resinous medium, particulate activated carbon medium, particulate matter that includes a substance to be released into the water (e.g. a disinfectant such as iodine, and a substance of nutritious value such as vitamins, food supplements, caffeine, or various flavoring compounds).

43. The filtering device of any of embodiments 39-42, wherein the treatment media or elements comprises: (i) a single component, for example homogeneous solid mass, e.g. a solid body of activated carbon, a single type of resin or a filter sheet; or (ii) a combination of different components, for example a mixture of two different particulate treatment components such as a mixture of two different resins, a mixture of a resin and activated carbon particles and a resin, a combination of a physical filter element such as a filter sheet (e.g. filter paper) and active treatment components such as activated carbon or another substance that interacts with the water by removal (e.g. through physical or chemical sorption) of a substance from the water.

44. The filtering device of any one of embodiments 39-43, wherein a defined water treatment function is being performed by more than one compartment.

45. The filtering device of any one of embodiments 39-43, comprising compartments that perform a unique water treatment function.

46. The filtering device of any one of embodiments 39-45, wherein
at least one direct flow water treatment module comprises
a first water treatment medium or element enveloping a lumen, the lumen defining an axis;
the first treatment medium or element being enveloped by an entry space linked and in flow communication with the module's water ingress; and
the lumen being linked to the module's water egress;
whereupon water flows in a general radial direction from said entry space to said lumen through said first treatment medium or element.

47. The filtering device of embodiment 46, wherein the treatment medium is a solid porous filtering body.

48. The filtering device of embodiment 46 or 47, wherein said lumen is substantially cylindrical.

49. The filtering device of any one of embodiments 46-48, wherein the lumen is defined by a void within a solid porous filtering mass.

50. The filtering device of any one of embodiments 46-48, wherein the lumen is defined by a perforated cylinder disposed within the compartment and surrounded by the treatment medium or element.

51. The filtering device of any one of embodiments 46-50, wherein said treatment medium or element is substantially tubular.

52. The filtering device of any one of embodiments 46-51, wherein the water egress of the first module is coaxial with said axis.

53. The filtering device of any one of embodiments 46-52, wherein said treatment medium or element is enveloped by first sheet of a porous matrix.

54. The filtering device of any one of embodiments 46-53, wherein the inner wall of said lumen is lined by a second sheet of a porous matrix.

55. The filtering device of embodiment 53 or 54, wherein said sheet has the general form of a corrugated or pleated sleeve.

56. The filtering device of any one of embodiments 53-55, wherein said sheet improves uniformity of radial water flow from the entry space to the lumen along said treatment medium or element, as compared to such flow without said sheet.

57. The filtering device of any one of embodiments 46-56, wherein said lumen comprises a second water treatment medium or element which may be of the same or different substance(s) than that of said first water treatment medium or element.

58. The filtering device of any one of embodiments 46-52, wherein the treatment medium or element is a physical filtering medium or element.

59. The filtering device of embodiment 58, wherein the filtering medium or element is a corrugated or pleated filter sheet.

60. The filtering device of any one of embodiments 39-59, wherein the water treatment medium in at least one compartment comprises activated carbon.

61. The filtering device of any one of embodiments 39-60, wherein
at least one serpentine flow water treatment module has a water treatment space formed between two end walls opposite to one another and having a water ingress formed at substantially the center of a first of the two opposite walls;
a curvilinear flow path being defined in the water treatment space by two or more concentric cylindrical wall sections, at least one of which extends into the treatment space form said first wall and at least one of which extends into the treatment space from the opposite wall; and
said treatment space containing at least one water treatment medium.

62. The filtering device of embodiment 61, wherein said serpentine flow module has a generally cylindrical shape with a cylinder axis extending between the two end walls and perpendicular thereto.

63. The filtering device according to any one of embodiments 39-62, wherein one or more of said modules are pre-assembled, stand-alone modules.

64. The filtering device of embodiment 63, wherein the water egress of one or more of said modules is defined within a projection that is adapted for being received into a matching depression formed in another component of the filtering device to thereby define the flow path.

65. The filtering device of embodiment 64, wherein the water ingress of one or more of said modules is formed in a depression adapted to receive a matching projection of another component of the filtering device to thereby define the flow path.

66. The filtering device of any one of embodiments 63-65, wherein one or more modules snap fit into engagement with another module.

67. The filtering device of any one of embodiments 58-66, wherein the housing comprises
two or more sub-housing structures, each of which house one or more water treatment compartments; and
one or more linking elements connecting the sub-housing structures and having water conduits defined therein to permit water flow between said sub-housing structures along said flow path.

68. The filtering device of embodiment 67, wherein each of said sub-housing structures is an elongated element.

69. The filtering device of embodiment 68, wherein the sub-housing structures are substantially cylindrical.

70. The filtering device of embodiment 68 or 69, comprising two sub-housing structures aligned with one another with the linking element being in normal orientation to that of said sub-housing structures.

71. The filtering device of embodiment 70, wherein the running water inlet and the filtered water outlet or formed within the linking element.

72. The filter device of embodiment 71, wherein the linking element is formed at a top end of the housing.

BRIEF DESCRIPTION OF THE DRAWINGS

In order to understand the invention and to see how it may be carried out in practice, embodiments will now be described, by way of non-limiting example only, with reference to the accompanying drawings showing schematic representations of such embodiments, in which.

DETAILED DESCRIPTION OF EMBODIMENTS

Figure 1:
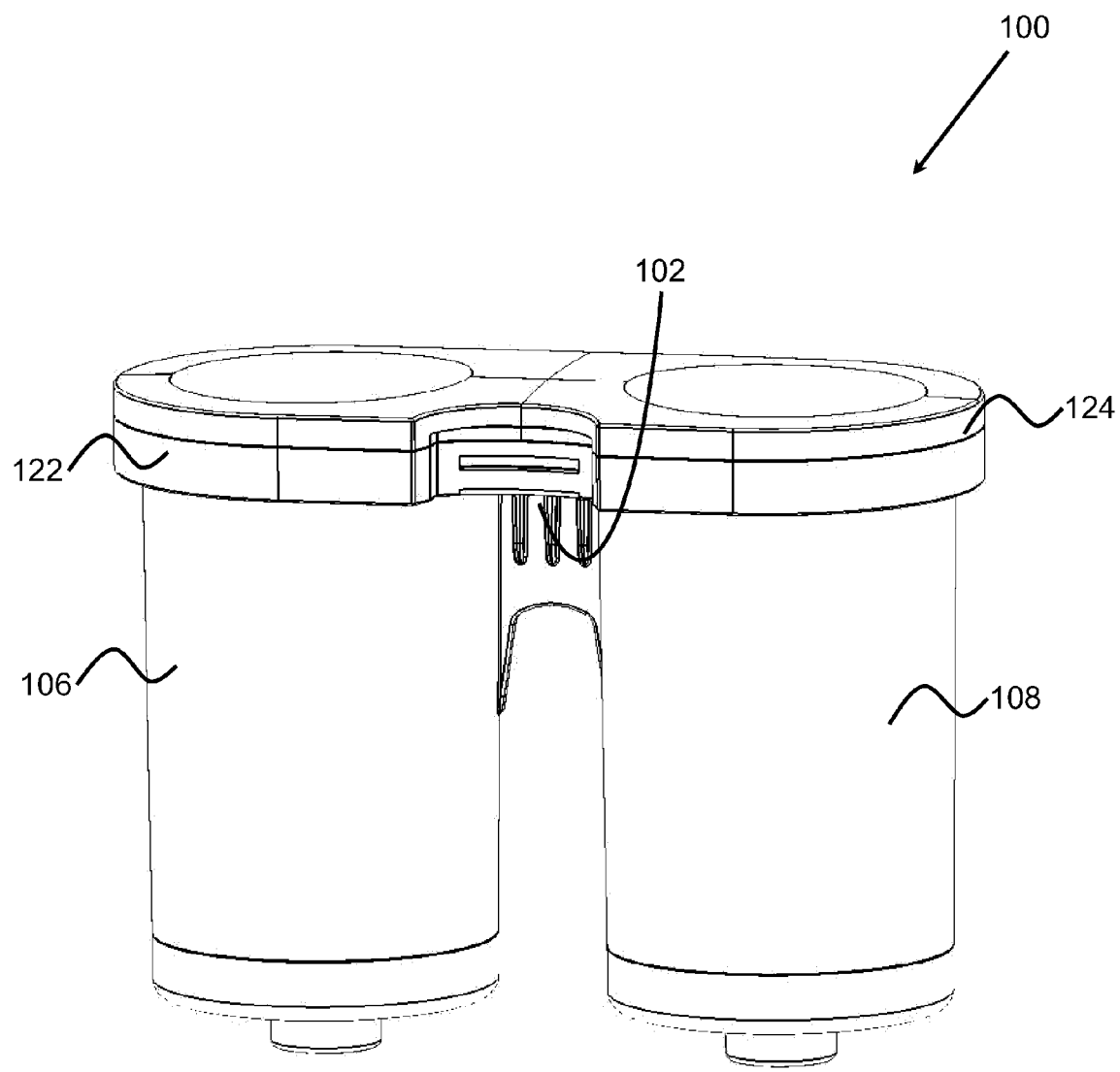
FIG. 1 is a perspective view of a filtering device with two aligned sub-housing structures according to an embodiment of the disclosure herein.
Figure 2:
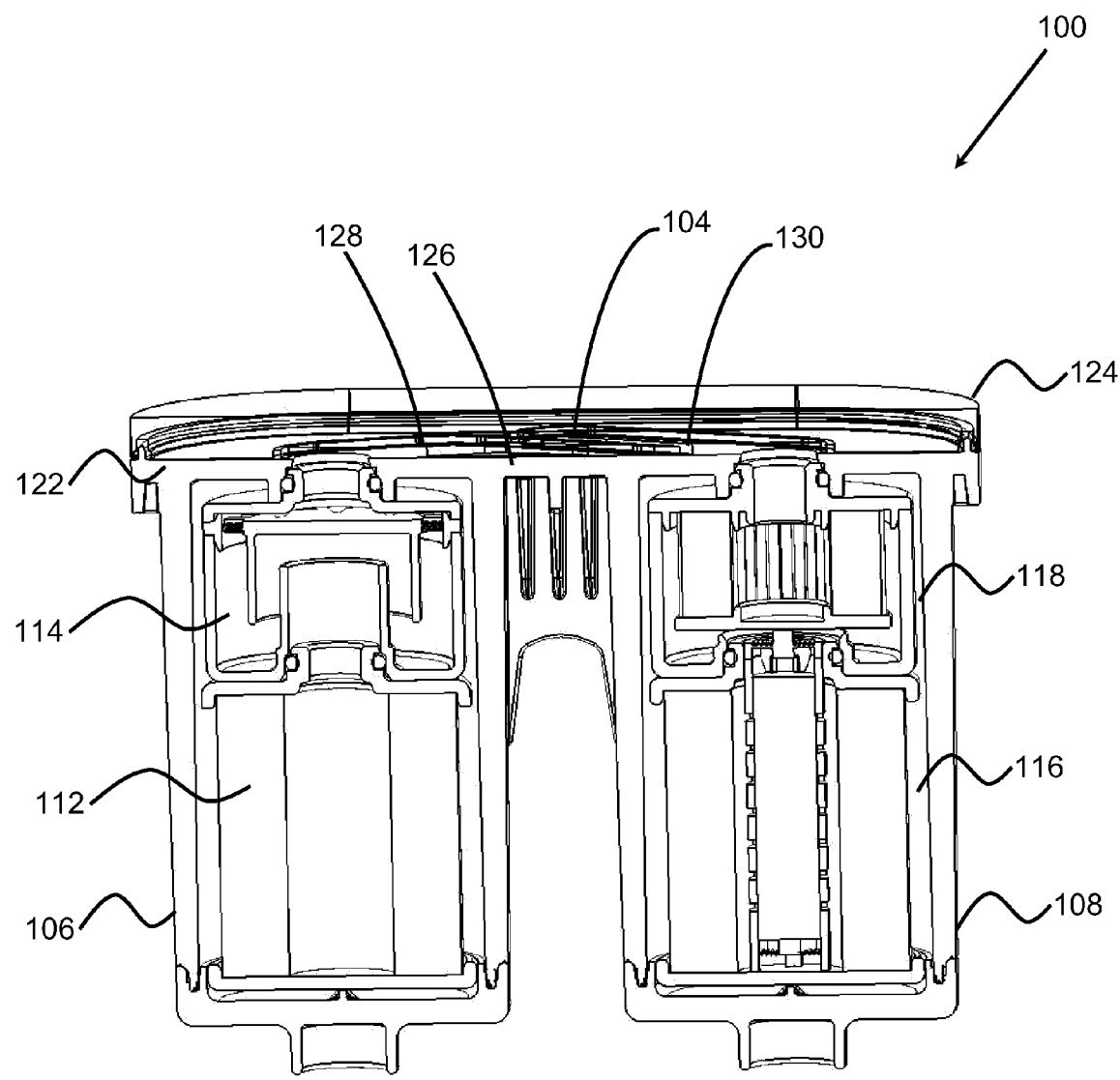
FIG. 2 is a longitudinal cross-section of the filtering device of FIG. 1.
Figure 3:
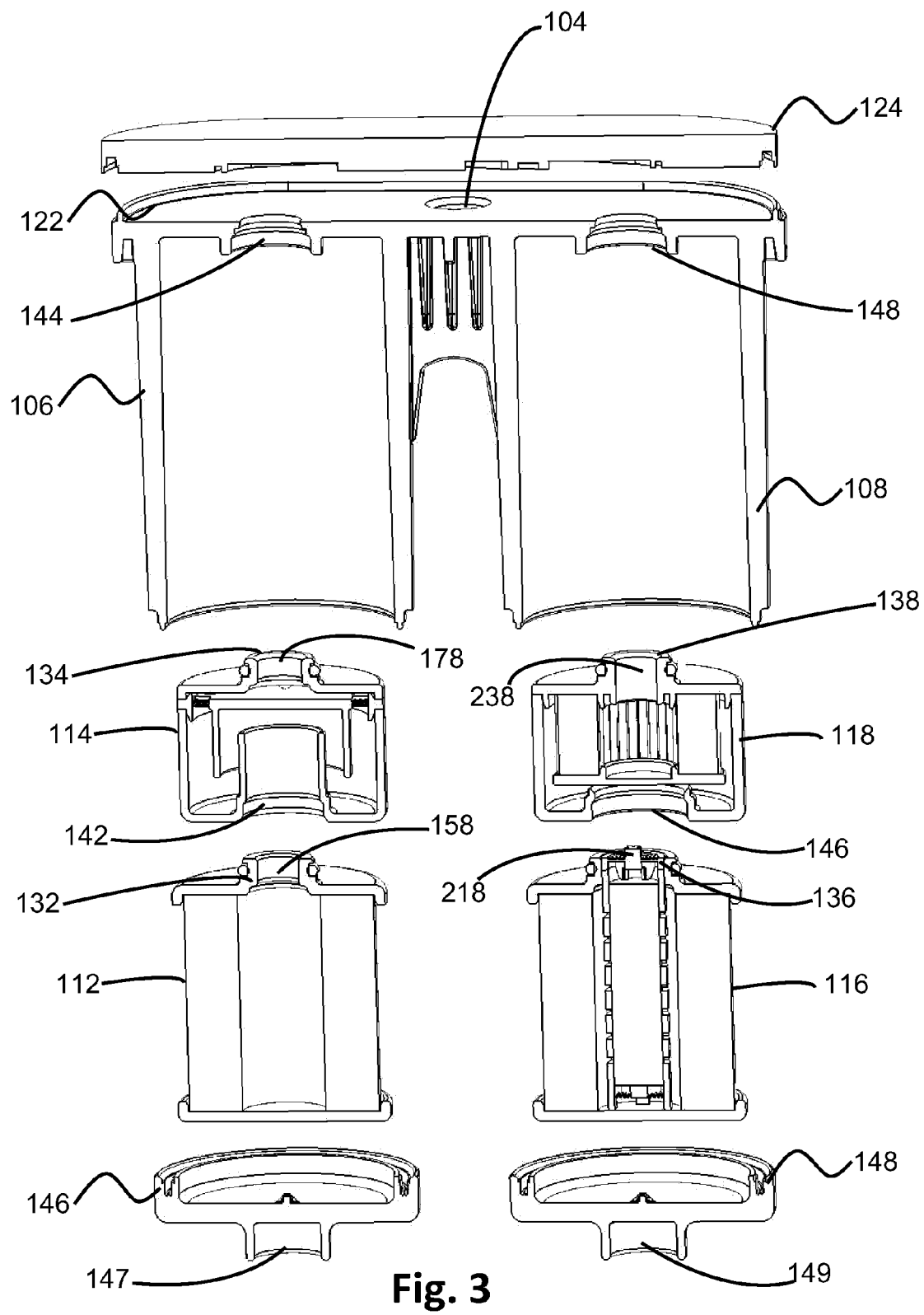
FIG. 3 is an exploded cross-sectional view of the filtering device of FIGS. 1 and 2.

A filtering device for filtering running water from a pressurized water source is illustrated in FIGS. 1-3. The device 100 has a housing with a running water inlet 102 and a filtered water outlet 104. The housing houses a plurality of water treatment modules, four in this specific embodiment—112, 114, 116 and 118, as can be seen in FIG. 2—each of which defines a water treatment compartment holding a water treatment medium or element, as will be further described below, performing a defined water treatment function. Each module, as will also be illustrated below, has a water ingress and a water egress: the water ingress of compartment 112 being linked and in flow communication with the running water inlet 102; the water egress of compartment 112 being linked and in flow communication with the water ingress of compartment 114; the water egress of compartment 114 being linked and in flow communication with the water ingress of compartment 116; the water egress of compartment 116 being linked and in flow communication with the water ingress of compartment 118; and the water egress of compartment 118 being linked and in flow communication with the filtered water outlet 104; to thereby defined a water flow path within the housing between the running water inlet 102 and the filtered water outlet 104 through the water treatment modules.

The housing has two cylindrical and aligned sub-housing structures 106 and 108, each of which houses water treatment modules, sub-housing structure 106 housing water treatment modules 112 and 114 and sub-housing structure 108 housing water treatment modules 116 and 118. A linking element 120 (best seen in FIG. 7) connects the two sub-housing structures. Linking element 120 includes a base member 122 integrally formed with an end of sub-housing structures 106 and 108 and a cover member 124. Formed in base member 122 are grooves that define three water conduits 126, 128 and 130 (best seen in FIG. 7) to permit water flow between said sub-housing structures along the water flow path as will be explained below.

The water treatment modules can best be seen in FIGS. 4A-5D.

As can be seen in FIG. 3, each of the modules 112, 114, 116 and 118 may be pre-assembled, substantially stand-alone modules, with the modules being fitted together and inserted into sub-housing structures 106 and 108 in the manner shown. As can be seen, modules 112 and 116 have respective projections 132 and 136, defining the water egresses of these modules, that are received into respective matching depressions 142 and 146 of respective water treatment modules 114 and 118, which depressions are the water ingresses of the two latter modules; modules 114 and 118 have respective projections 134 and 138, defining the water egresses of these modules, that are received in respective depressions 144 and 148 formed in base member 122. Fluid-tight fit between the respective projections and depressions is achieved through an O-ring received in a lateral groove which will be further described below. Once the modules are accommodated within the sub-housing structures, sub-housing structures 106 and 108 are sealed with respective closure members 146 and 148, each having respective downward projections 147 and 149 for securing the fitting of filtering device 100 in a countertop drinking water dispensing device.

Cross-sectional views of each of modules 112, 114, 116 and 118 are seen, in isolation, in FIGS. 4A-4D, respectively; respective exploded perspective views of each of these modules are seen in FIGS. 5A-5D.

Figure 4A:
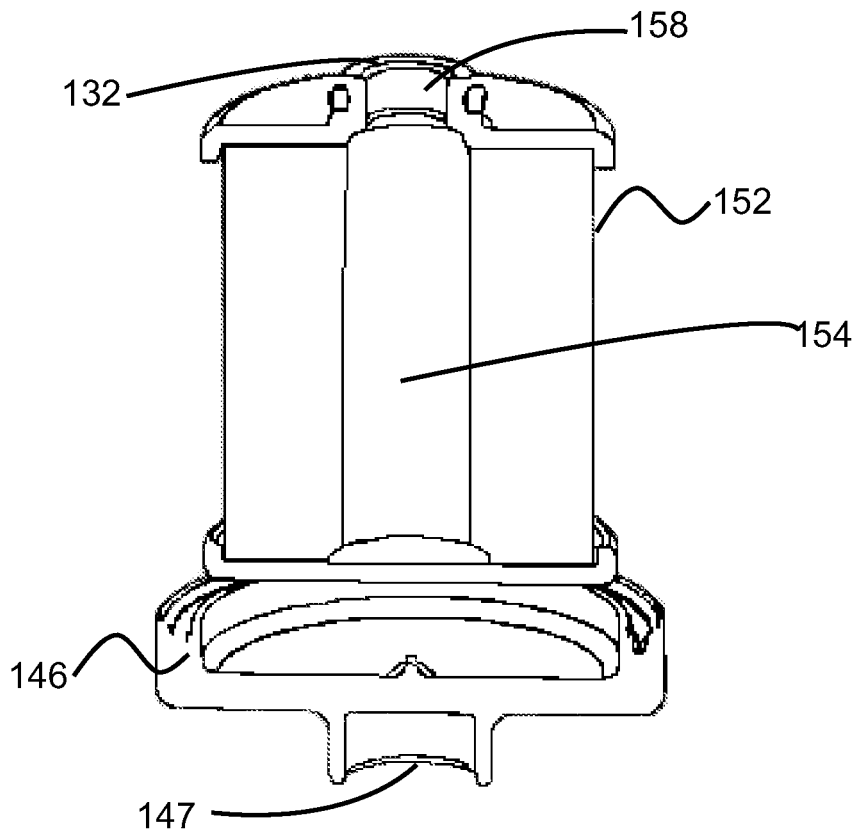
FIGS. 4A-4D are enlarged cross-sectional views of each of the water treatment modules of FIG. 3.
Figure 5A:
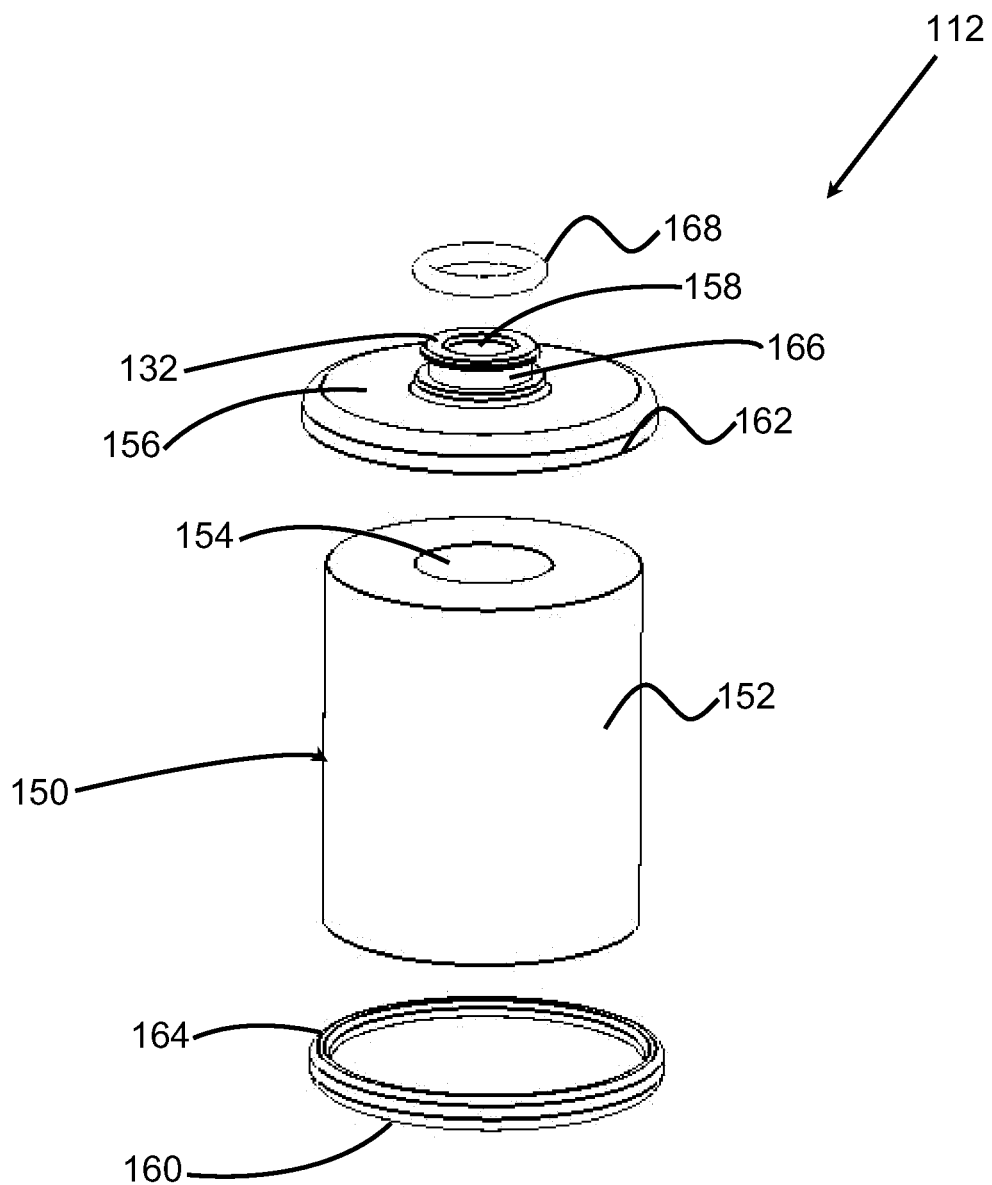
FIGS. 5A-5D are exploded perspective views of the water treatment modules of FIGS. 4A-4D, respectively.

Module 112, which is seen in isolation FIGS. 4A and 5A, is of the kind referred to above as the "direct flow WTM", and has a water treatment compartment generally designated 150, including a tubular porous activated carbon body 152 defining a cylindrical lumen 154. Lumen 154 defines a longitudinal axis and is coaxial with projection 132 formed in a top plate 156 and with the opening 158 defined therein serving as the module's water egress. Module 112 further includes a bottom plate 160, both top plate 156 and bottom plate 160 have respective skirts 162 and 164 which snap-fit over the upper and lower edges of body 152. As can be noted, plates 156 and 160 have a larger diameter than that of body 152 and thus an entry space is defined between it and opposite inner walls of sub-housing structure 106, as will also be illustrated below (can be seen best in FIG. 6A further described below). Once assembled, a direct flow path is formed between lumen 154 and opening 158 such that water that flows radially from said entry space, through body 152 flows into lumen 154 and therethrough our of opening 158. Projection 132 has a lateral annular groove 166 accommodating an O-ring 168, the function of which has already been mentioned above.

Figure 4B:
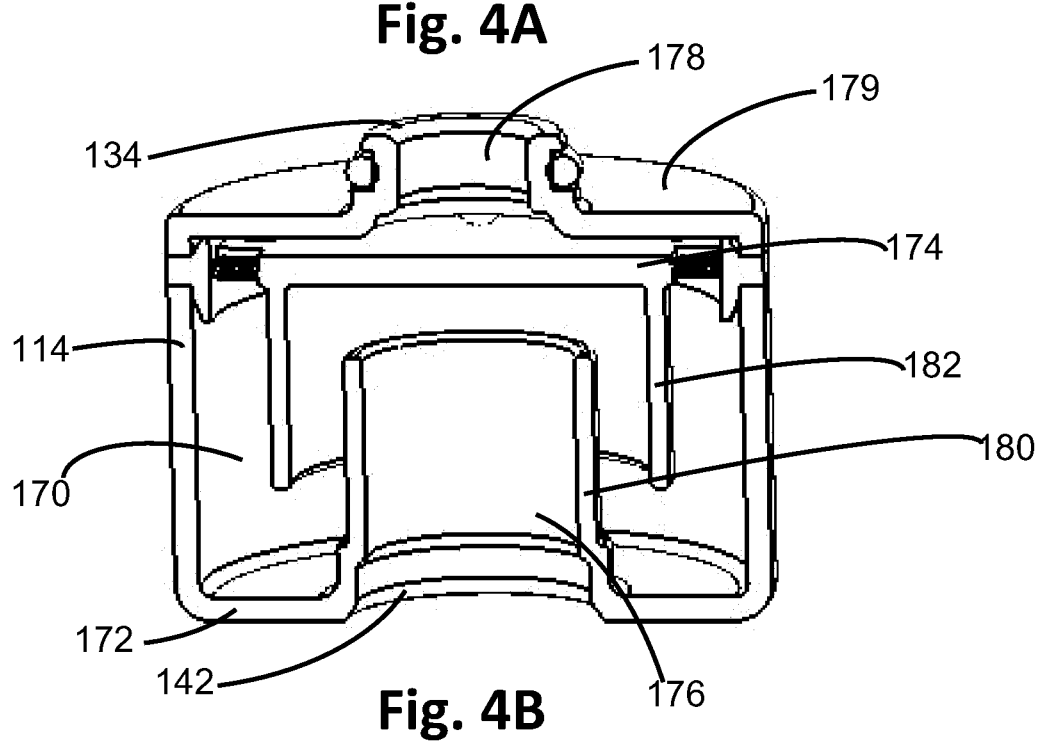
Figure 5B:
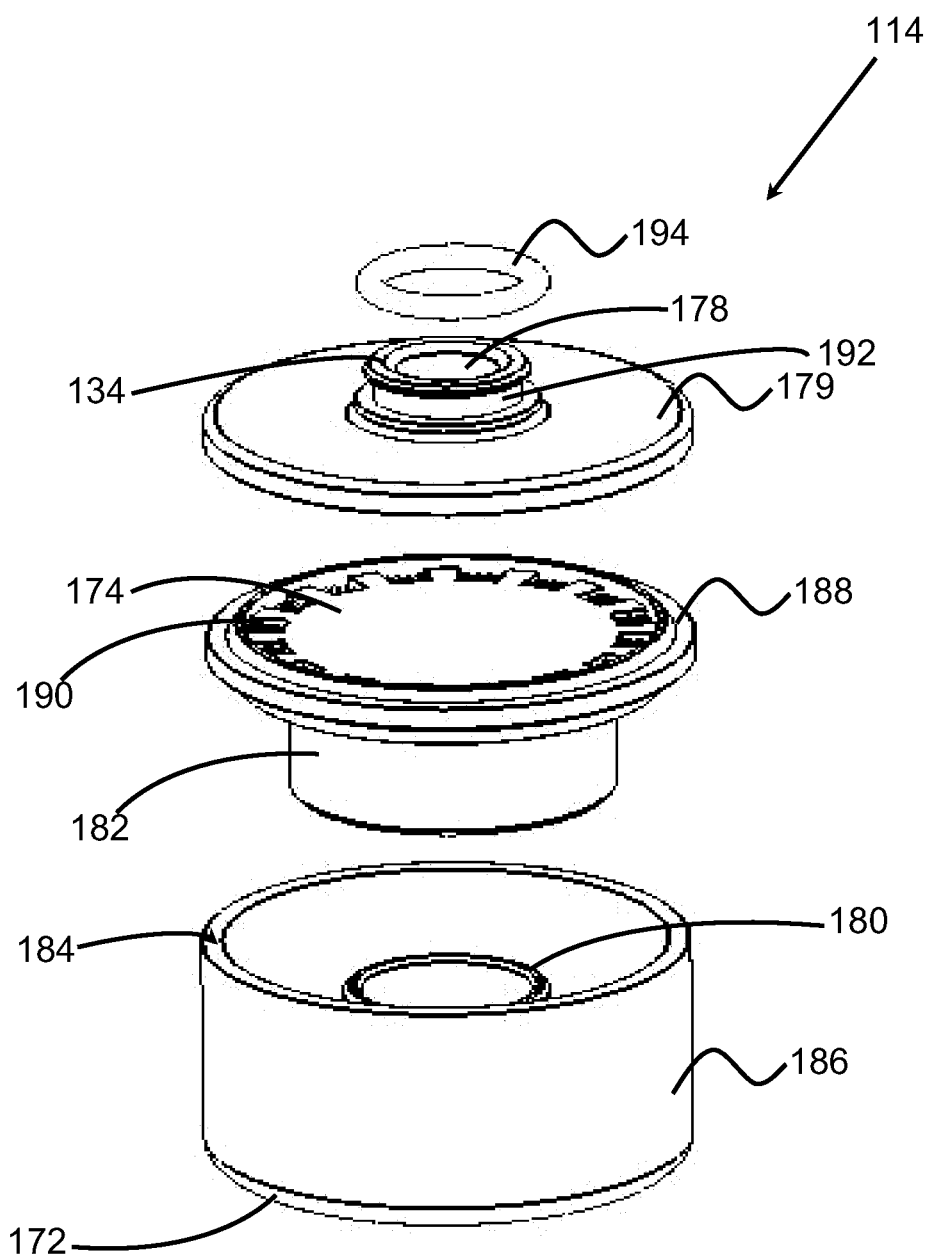

Module 114, seen in isolation in FIGS. 4B and 5B, is of the kind referred to above as the "serpentine flow WTM", and has a water treatment space 170, formed between a bottom wall 172 and a top wall 174. An opening 176 is formed in bottom wall 172, serving as the water ingress of this module and opening 178, formed in projection 134, serves as the water egress of the module. Two concentric cylindrical walls extend into the water treatment space 170, consisting of wall 180 surrounding opening 176 and extending upward from bottom wall 172; and wall 182 extending downwards from wall 174 into the treatment space. These two concentric walls jointly define a radial, curvilinear flow path of the water between ingress 176 and egress 178.

As can be seen particularly in FIG. 5B, module 114 is assembled from four elements, including a housing element 184, defining the bottom wall 172, the cylindrical wall section 180 and side walls 186 of the water treatment space 170; an element 188 that defines the downwardly projecting cylindrical wall 182, defining the upper wall 174 of the water treatment space, which includes in its periphery a plurality of apertures 190 that permit water egress from the water treatment space 170. Also included is a top plate 179, which once fitted over element 188, leaves a clearance permitting water to flow from apertures 190 out through water egress 178. Projection 134 has a lateral, annular groove 192, accommodating an O-ring 194, the function of which has already been noted above. Prior to the assembly of these four elements, a water treatment medium which may be, for example, activated carbon in granular form, is inserted into the water treatment space. Typically, apertures 190 are formed with a mesh to block outflow of components of the water treatment medium contained in water treatment space 170.

Figure 4C:
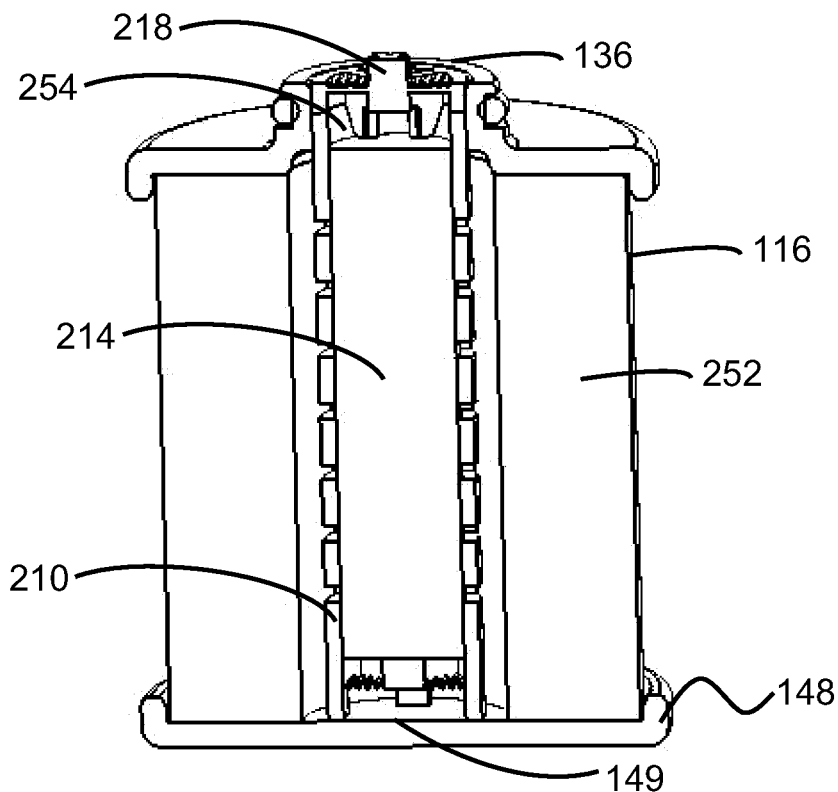
Figure 5C:
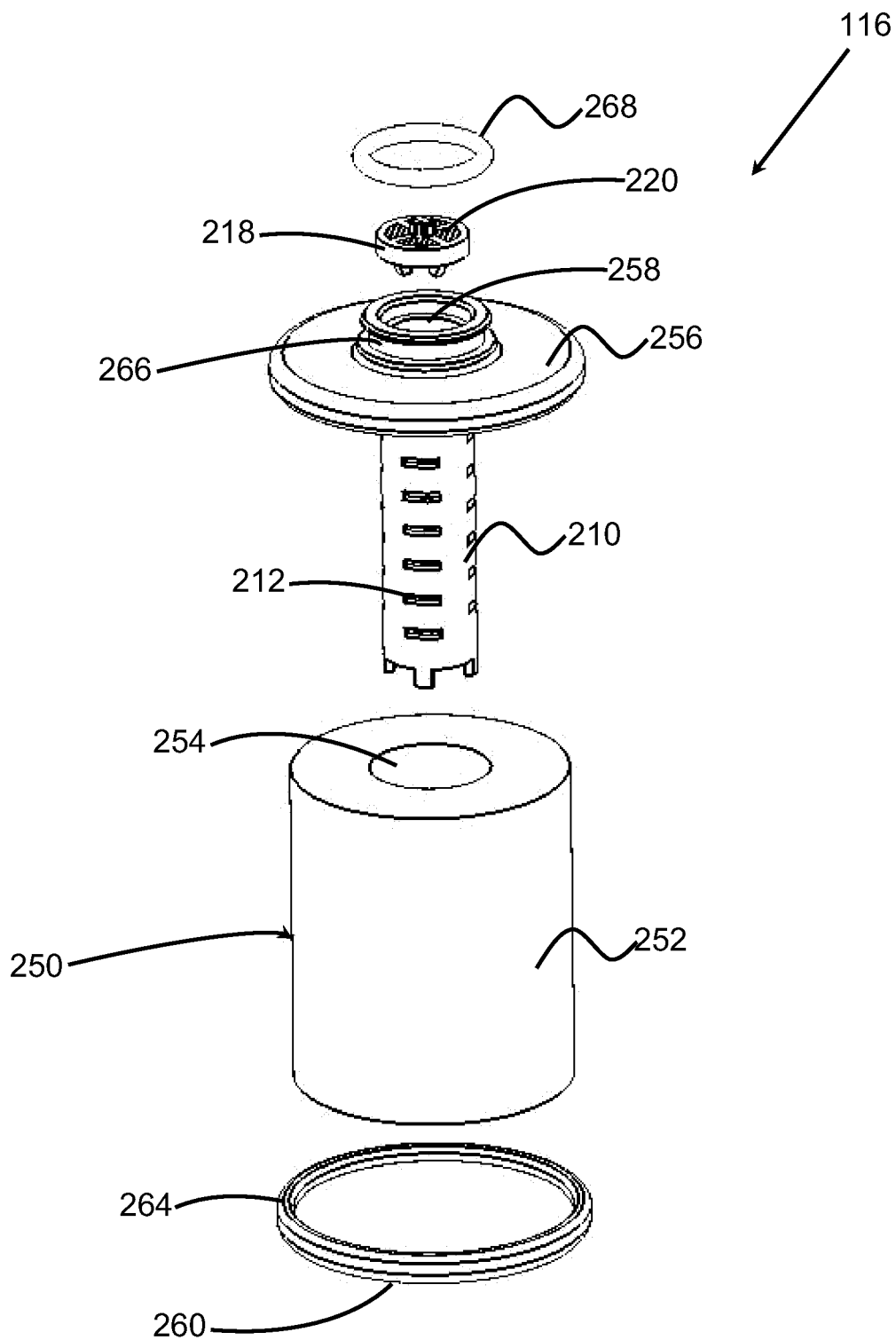

Module 116, seen in isolation FIGS. 4C and 5C, is also of direct flow WTM. This module has similar elements to those of module 112, and like elements to those of module 112 have been given the like reference numerals, shifted by 100. The reader is referred to the description of module 112 for an explanation their structure and function. Carbon body 252 may be of the same or different composition than carbon body 152 of module 112. The main structural difference is the inclusion of a cylindrical element 210 with a plurality of perforations 212 formed thereon, downwardly extending from top plate 256, which may be integrally formed or snap-fitted therewith, and having a lumen 254 which is in direct flow communication with component 258. As can be seen in FIG. 4C, cylindrical element 210 holds water treatment medium 214 which may be the same or different that carbon body 252 (typically different) and may, for example, be a disinfectant compound, such as resinous or polymeric material that can release disinfecting molecules, e.g. bromine or iodine, into the water. Thus, water passing through carbon body 252, enters lumen 254 through the perforations 212 and then flows through the water treatment medium 214 to eventually egress through opening 258, which serves as a water egress of module 116. Snap-fitted onto component 258 is a sieve element 218 which includes sieve opening 220, intended to permit outflow of water but block components of the water treatment medium that may be carried thereby.

Figure 4D:
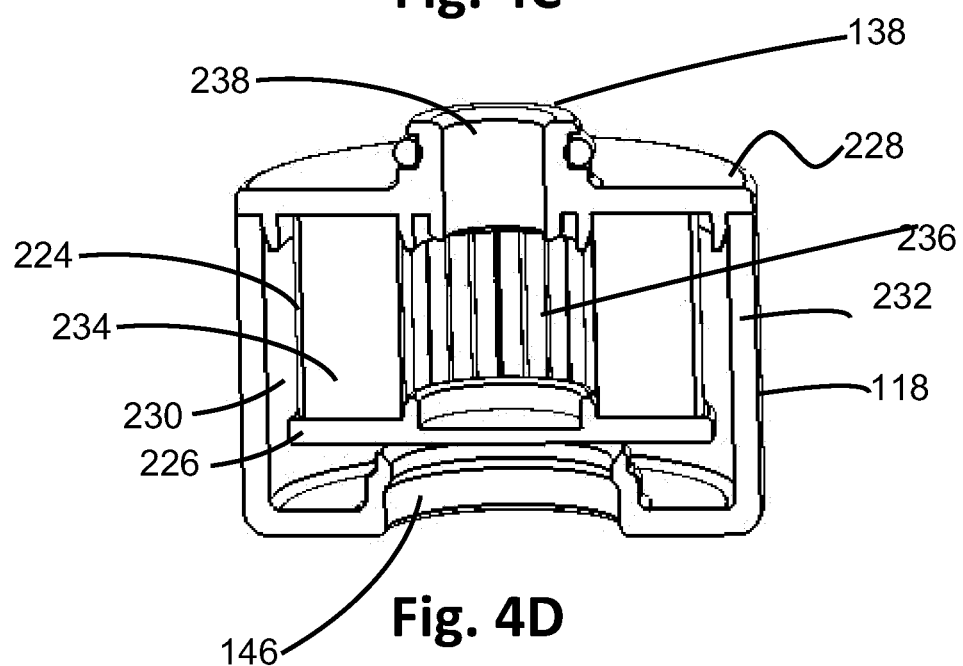
Figure 5D:
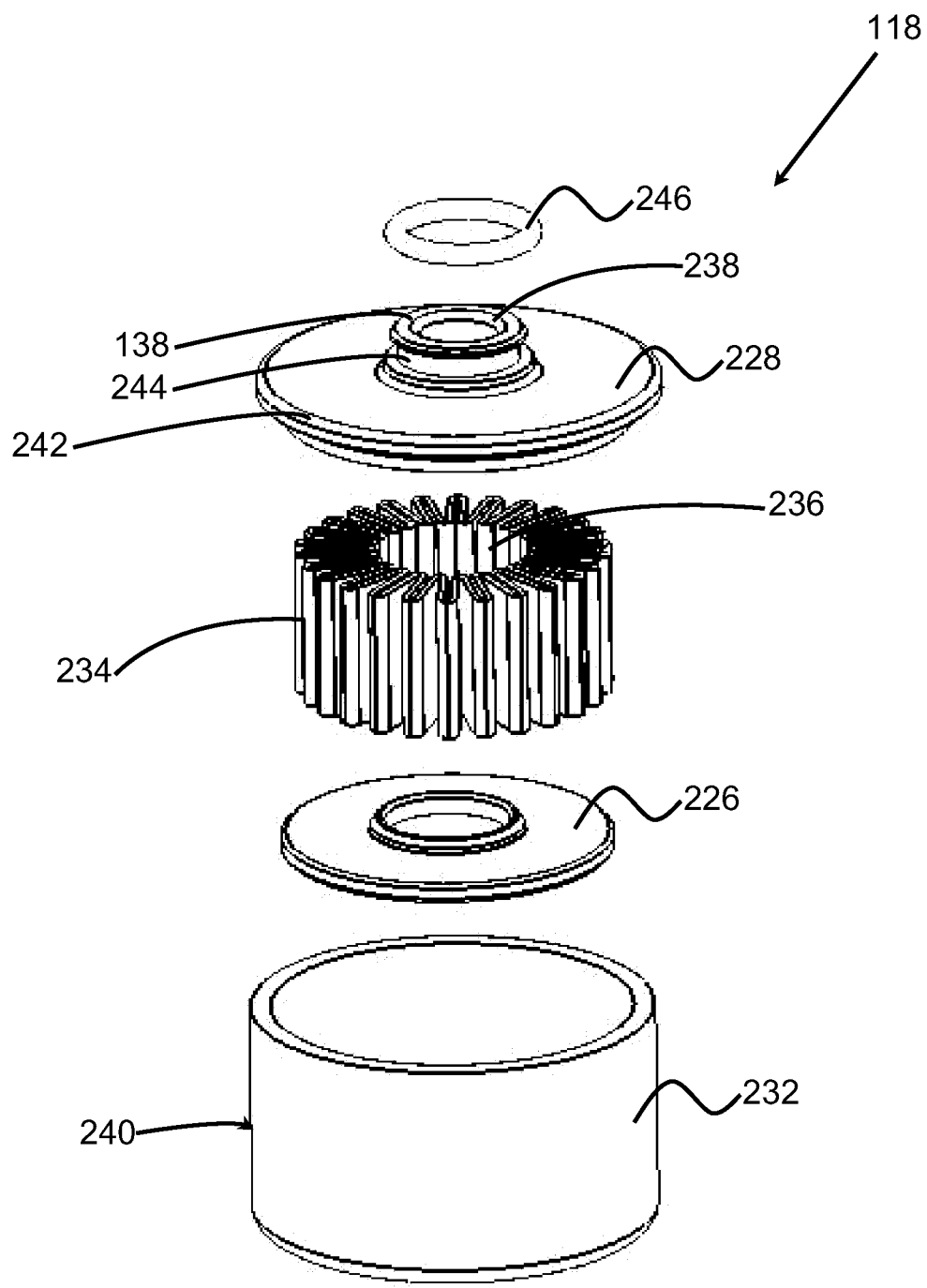

Module 118, seen in isolation in FIGS. 4D and 5D, is also of direct flow WTM. Water treatment module 118 has a water treatment space, defined between a bottom plate 226 and a top plate 228. Water ingressing through opening 146, serving as the water egress of module 118, enters into a water entry space 230 which includes a portion below plate 226 and a lateral portion along side walls 232. Module 118 has a treatment element 234 formed around a lumen 236 in flow communication with opening 238, defined in projection 138. The element 234 is, by some embodiments a corrugated or pleated filter sheet. In the specifically illustrated embodiment it is a pleated filter sheet. Water ingressing through egress 146 enters the entry space 230 and then flows laterally through treatment element 234 into lumen 236; and then out through opening 238 that serves as a water egress of module 118. Optionally, peripheral to the element 234, a water treatment medium may be disposed.

As can be seen, in particular, in FIG. 5D, water treatment module 118 has five structural elements, fitted with one another, and includes a main housing element 240 defining side walls 232 and the bottom wall with opening 146, a bottom plate 226, filter element 234, top plate 242 defining the upper wall 228 and projection 138 with its opening 238, with annular groove 244 accommodating an O-ring 246.

Figure 6A:
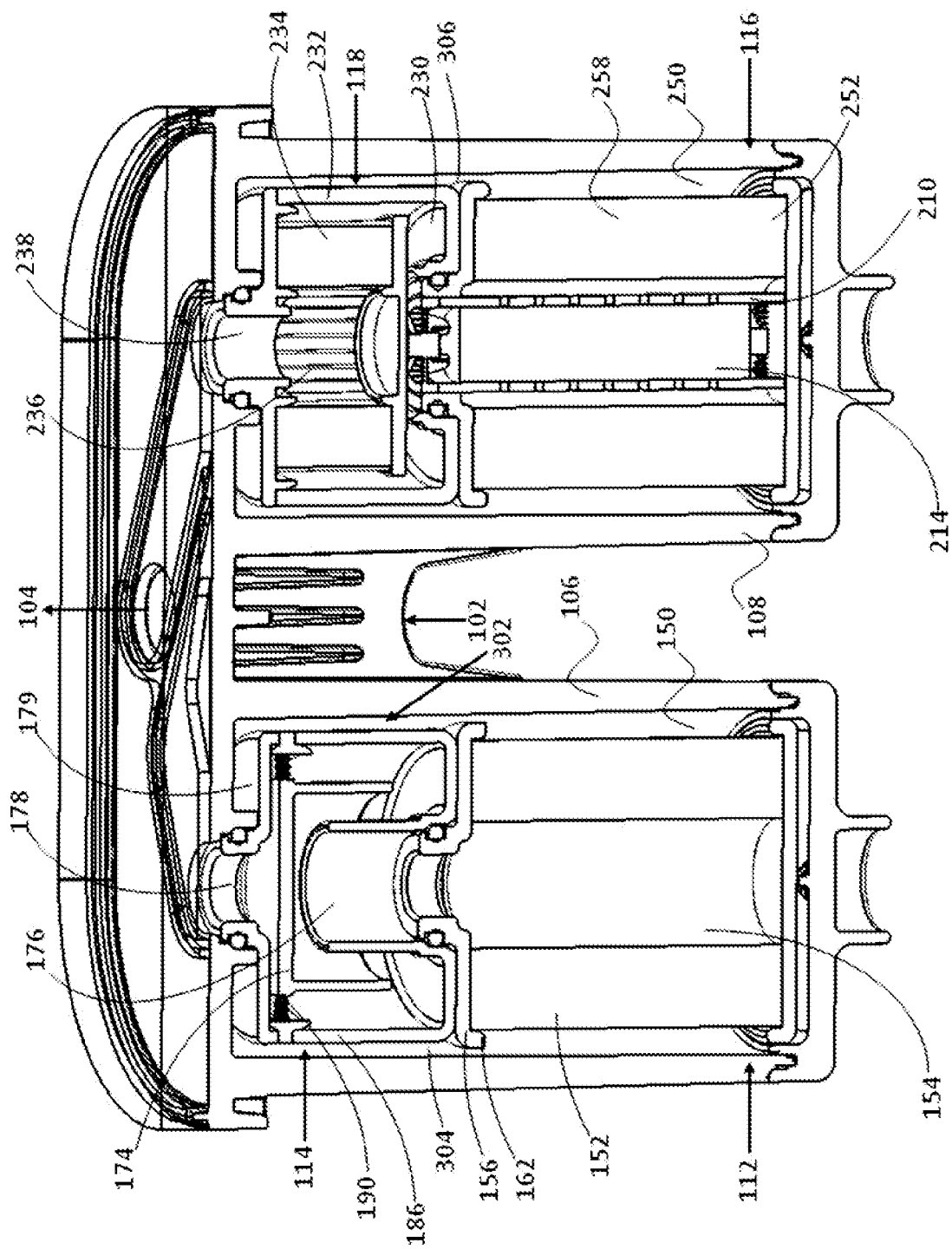
FIG. 6A shows a longitudinal cross-section perspective view of FIG. 2, illustrating the water flow path through the device (FIG. 6B).
Figure 6B:
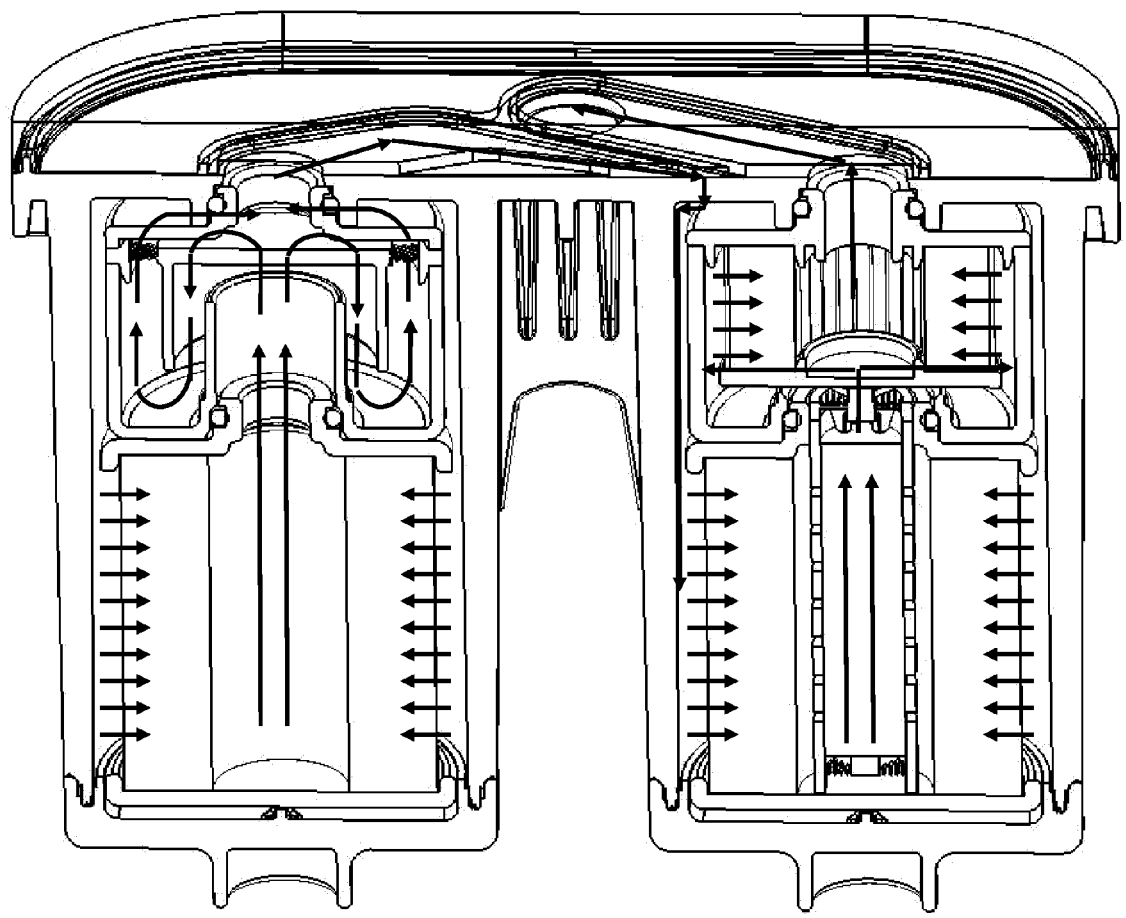
Figure 7:
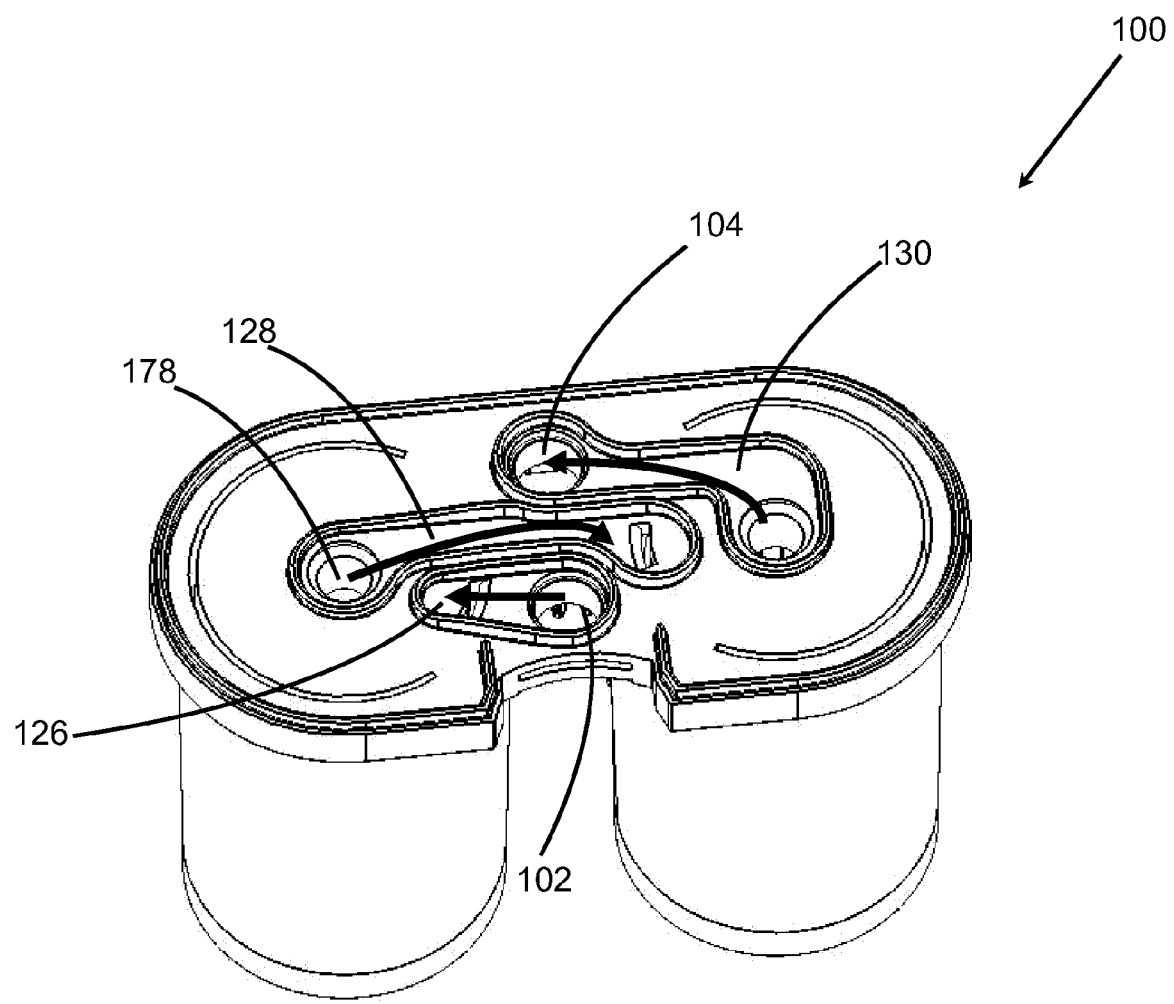
FIG. 7 is a top perspective view, with cover of the linking element removed, to illustrate the water flow pattern therein.

FIGS. 6A-6B are cross-sectional views of the filter and FIG. 7 is a perspective view with top cover 124 removed, illustrating the water flow path within the filtering device 100. In FIG. 6B and FIG. 7, the water flow path is schematically illustrated through the use of arrows.

Water ingressing through running water inlet 102, flows along the water conduit defined by groove 126, to enter a lateral space 302 formed between side walls 186 of treatment module 114 and internal walls of sub-housing structure 106, and then through a lateral clearance 304 formed peripheral to skirt 162 of top plate 156, which serves as a water ingress of module 112. Water entering into entry space 150, flows then radially through carbon body 152 into lumen 154 and then egresses through water egress 158 into water ingress 176 of treatment module 114. From water ingress 176, the water flows radially, in a curvilinear path, through the medium contained in treatment space 170, and exiting through apertures 190 into the space formed between walls 174 and top plate 179 to egress through opening 178. The water then flows through the conduit defined by groove 128 to enter into the lateral space defined between side walls 232 of treatment module 118 and internal walls of sub-housing structure 108; then through clearance 306 that serves as the water ingress of module 116 and enters the entry space 250 of module 116. The water then flows radially through carbon body 252 into lumen 210, to then flow through treatment medium 214 towards water egress 258.

Water entering into module 118 flows into entry space 230; and then, radially through filter element 234 into lumen 236 to eventually exit through egress 238 into the conduit defined by groove 130, to exit through filtered water outlet 104.

Figure 8:
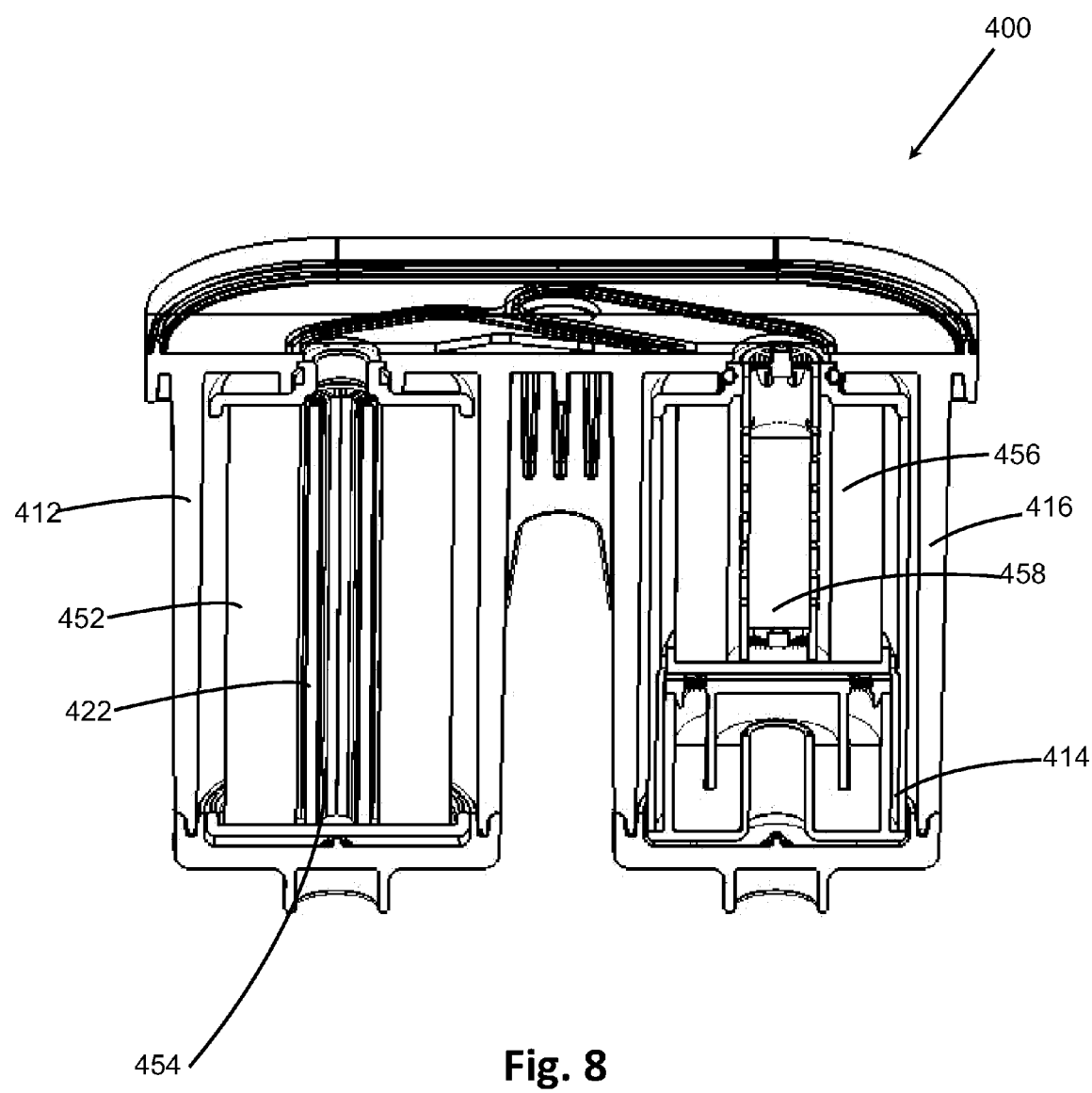
FIGS. 8 and 9 show longitudinal cross-sections through water filtering devices.
Figure 9:
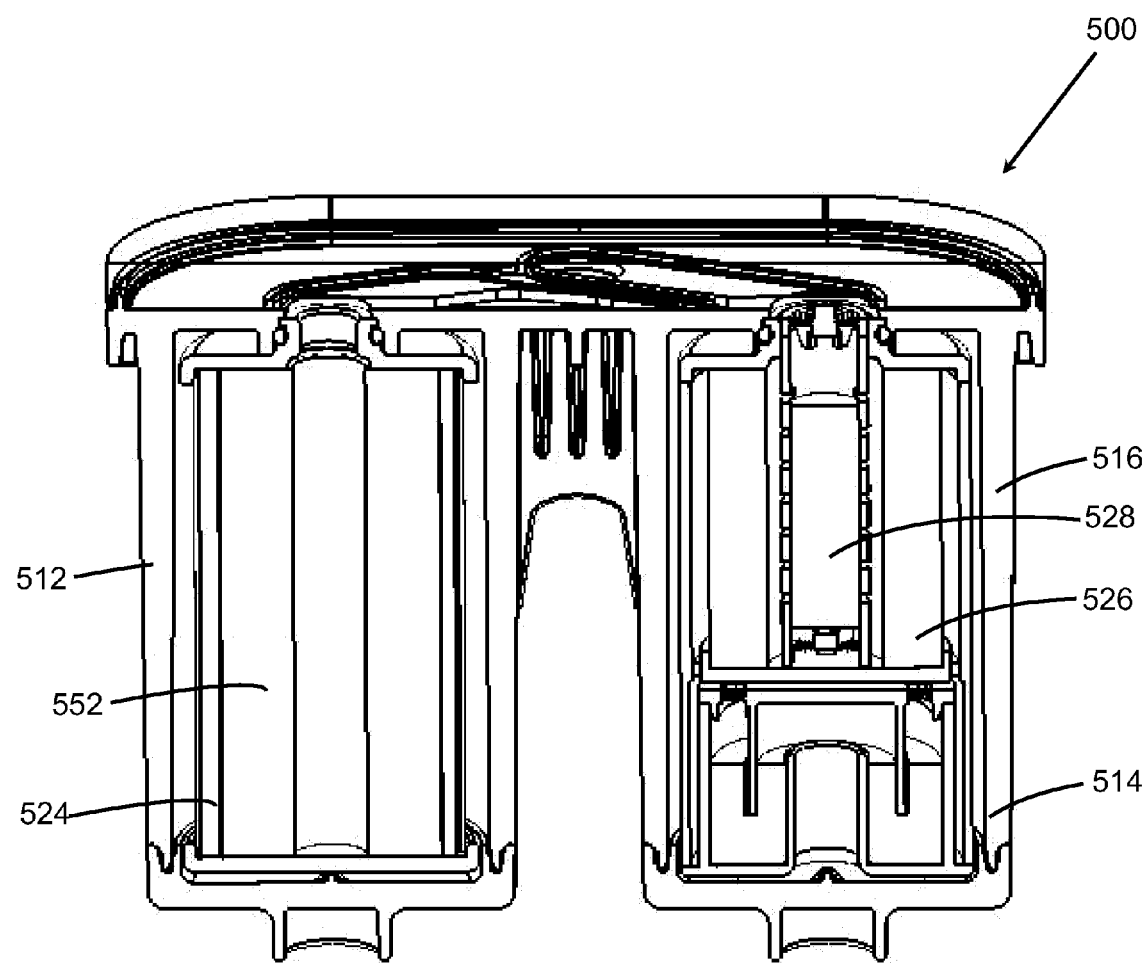

Reference is made to FIGS. 8 and 9 showing filtering devices 400 and 500, respectively, of other embodiments to those of the filtering device described above. As noted, both devices include three water treatment modules (as compared to the four of device 100) including modules 412, 414 and 416 of device 400 and modules 512, 514 and 516 of device 500. Modules 414 and 514 are similar in structure and function to modules 114 of device 100; and likewise, modules 416 and 516 are similar in structure and function to module 116 of device 100. The reader is referred to the description of the structure and function of modules 114 and 116 in explanation of the structure and function of modules 414, 416, 514 and 516.

Module 412 is similar to module 112 of device 100, the difference being the inclusion of a corrugated sheet 422, made of a porous matrix, lining the inner walls of lumen 454 of module 412. This sheet serves for filtering out coarse, particulate matter that may be carried by the water or released by carbon body 452, as well for providing a pressure element for ensuring relatively uniform, radial flow of water along carbon filter body 452. Other than these differences, module 412 is similar in structure and function to module 112 of device 100; and the reader is referred to the description above to gain a full understanding of the structure and function of module 412.

Module 512 is also of similar structure and function to module 112 of device 100; the difference being that carbon body 552 is enveloped by a corrugated sheet 524 made of a porous matrix, such as a filter paper, that serves to filter out coarse, particulate matter that may be carried by the water and also serves as a pressure element to ensure relatively uniform flow of water throughout the length of carbon body 552.

Overall, the water flow path throughout filtering devices 400 and 500 is similar to that of device 100.

Figure 10:
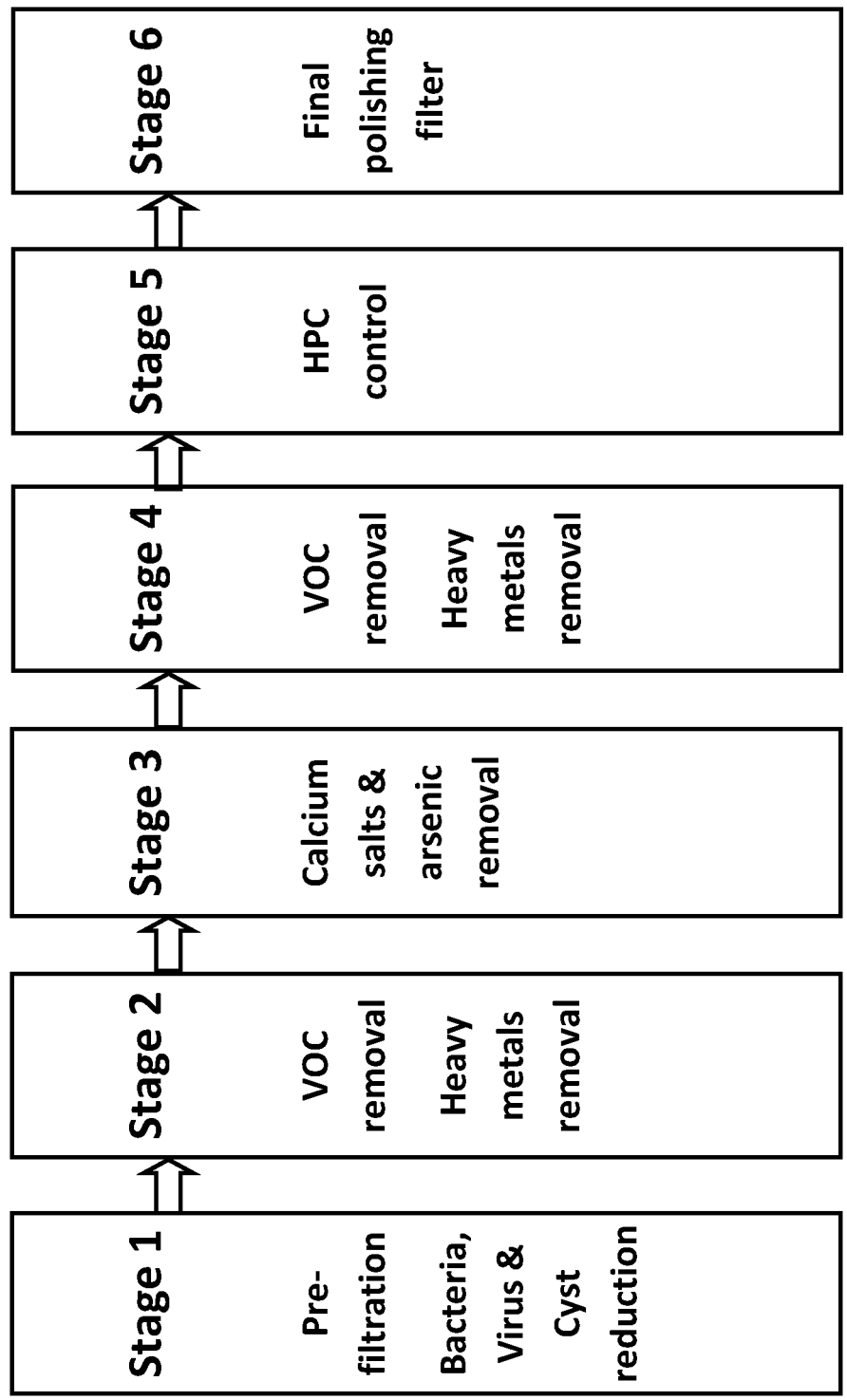
FIG. 10 is a schematic illustration of a succession of water treatment functions, along the water flow path in an embodiment of the filtering device.

Reference is now made to FIG. 10, which is a schematic illustration of a succession of water treatment functions, along the water flow path in an embodiment of the filtering device. Shown are different stages of water treatment, each achieving a specific treatment function. It should be noted that some successive stages may, by some embodiments, be carried out within the same compartment or module, the succession of stages being ensured by the arrangement of different treatment media/elements in the compartments or module. However, some of the stages may each be carried out in a different compartment or module. It should also be noted that the illustrated stages and their treatment functions are but an example and the sequence of stages may be different by some embodiments, some functions may be missing in other embodiments, some embodiments may involve treatment stages where other functions are being carried out, etc.

The following treatment functions are carried out in the 6 treatment stages of the water treatment process schematically illustrated in FIG. 10:

Stage I: pre-filtration treatment function of removal of particulate matter, humates, colloids, microbiological contaminates as bacteria virus and cyst from the water. This stage can be performed by either one or more media. Examples of treatment elements to perform this function are filter sheets such as a pleated paper filter sheet.

Stage II: treatment function of removal of heavy metals and/or volatile organic compounds (VOC). Examples of a treatment media/elements to achieve this function are a variety of forms of activated carbon, e.g. in the form of a solid block.

Stage III: treatment function of removal of inorganic contaminates such as arsenic, fluoride and/or calcium. Examples of treatment medium/element to achieve this function are specific resins, activated alumina and forms of nano-carbons.

Stage IV: a second treatment function identical to Stage II.

Stage V: disinfecting treatment function through release of a bactericide such bromide, iodine, fluorine bearing compounds into the water, or any filtration media/element with microbial contaminates removal ability. Examples of treatment media/elements to achieve this function are resinous or polymeric materials that release bromine into the water such as HaloPure® (a product distributed by HaloSource, Inc., USA).

Stage VI: final stage of filtering for improving taste, malodor nutrilizing effects, final solid particulate matter removal and/or enrichment of the water with a substance having a flavoring or nutritional value. Examples of treatment media/elements to achieve this function are activated carbon in particulate or solid porous block form, a filter sheet with final polishing effect, water soluble flavoring compounds, etc.

The implementation of the different treatment stages in the different modules of the filtering device 100 of FIGS. 1-7, filtering device 400 of FIG. 8 and filtering device 500 of FIG. 9 is shown in the following table (where more than one treatment stage is carried in a module, shown in brackets are the numbers of the respective element of the module):

| Device | Stage I | Stage II | Stage III | Stage IV | Stage V | Stage VI |
|---|---|---|---|---|---|---|
| 100 | None | Module 112 | Module 114 | Module 116 (252) | Module 116 (214) | Module 118 |
| 400* | Module 412 (422) | Module 412 (452) | Module 414 | Module 416 (456) | Module 416 (458) | None |
| 500 | Module 512 (524) | Module 512 (552) | Module 514 | Module 516 (526) | Module 516 (528) | None |

*In filtering device 400, Stage II precedes Stage I.

Figure 11:
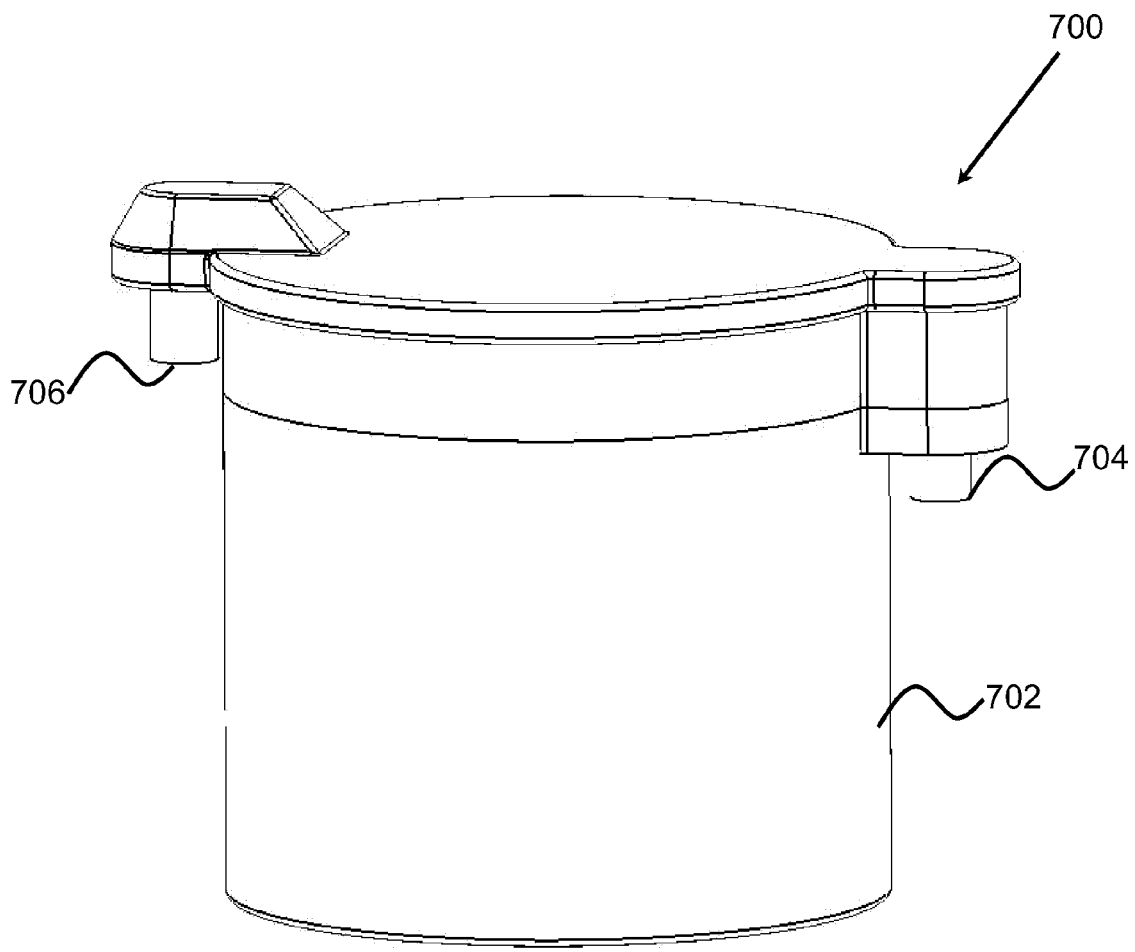
FIG. 11 is a perspective view of a filtering device according to another embodiment of this disclosure.
Figure 12:
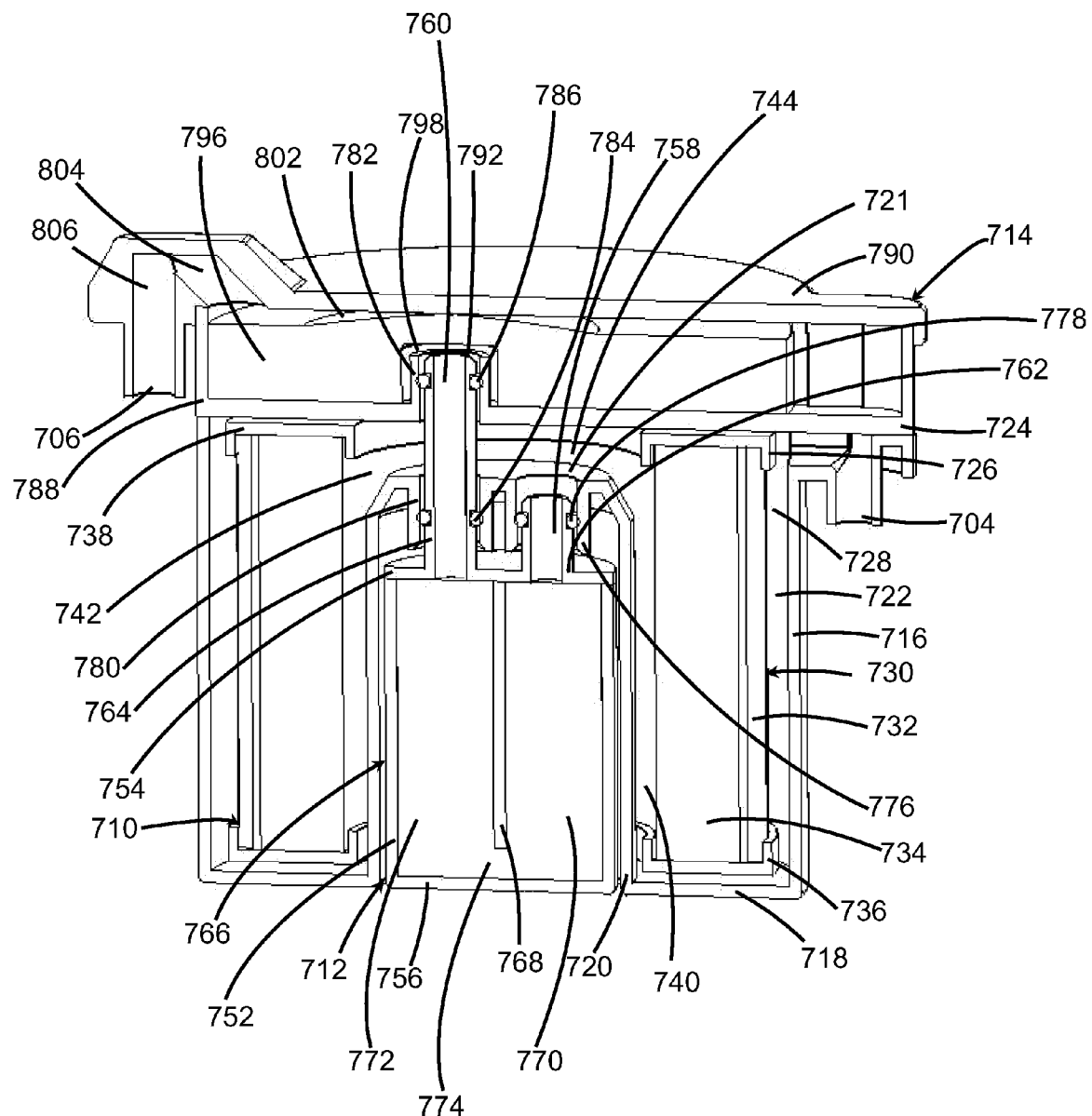
FIG. 12 is a longitudinal cross-section of the device of FIG. 11.

Reference is now being made to FIGS. 11 and 12 showing a filtering device 700 according to another embodiment of this disclosure. Device 700 includes a housing 702 with a running water inlet 704 and a filtered water outlet 706. As can be seen in FIG. 12, housing 702 houses three water treatment modules 710, 712 and 714.

Module 710 defined between side wall 716, bottom wall 718, side wall 720 and top wall 724 of the generally cylindrical cavity 722 formed at the center of bottom wall 718, and top wall 724. It includes a water ingress 726, in flow communication with running water inlet 704, leading into an entry space 728, defined between wall 720 and water treatment assembly 730. Assembly 730 includes a sleeve of a filter matrix 732, enveloping a porous tubular body 734 made, for example, of activated carbon. Assembly 730 is being held together and in position by two flanking members 736 and 738. Defined between internal walls of body 734 and wall 720 is a water collecting space 740 linked to a head space 742. A water egress 744 is formed as an opening in wall 721. Water ingressing through running water inlet 704, flows through ingress 726, entry space 728, and then radially through the treatment assembly 730 into collecting space 740 and eventually egresses out of water egress 744.

Module 712 includes a generally cylindrical housing with side wall 752 and top and bottom walls 754 and 756, respectively, and having a water ingress 758 and water egress 760 defined by respective tubular bodies 762 and 764, integrally formed with and extending upwards from wall 754. Module 712 houses a water treatment compartment 766, filled with a water treatment medium that may, for example, be activated carbon or resinous ion exchange substance. A divider wall 768 divides compartment 766 into two sub-compartments 770 and 772 leaving a clearance 774 at the bottom through which water can flow. Thus, water ingressing through water ingress 758, flows through the length sub-compartment 768, through clearance 774, then through the length of sub-compartment 772 to egress out of water egress 760.

As can be seen, tubular body 762 is accommodated within downwardly extending cylindrical sleeve 776, flanking water ingress 758. A fluid-tight seal is achieved through an O-ring 778, held in an annular groove on tubular body 762. Tubular body 764, which is longer than tubular body 762, extends through tubular sleeve 780, downwardly extending from wall 721, then through head space 742 with its top portion being accommodated within sleeve 782 extending upwardly from horizontal wall 724. Fluid-tight seal between tubular body 764 and sleeves 780 and 782 is achieved through respective O-rings 784 and 786 held each in its respective annular groove.

Module 714 is defined between horizontal wall 724, side walls 788 extending upwardly therefrom and top cover 790. Water ingress 792, defined by the upper opening of tubular body 764, leads into a water treatment compartment 794, which holds a block 796 of water treatment medium, which may, for example, be activated carbon, flavoring releasing compounds, polymeric compounds, etc. Block 796 is formed with a bottom cavity 798, situated over water ingress 792 and has an abutment 802 formed at its top that bears upon an internal face portion of cover 790. Consequently, water ingressing through ingress 792 spreads in an upwardly-curved radial direction into the head space 804 defined peripheral to abutment 802, to eventually egress through water egress 806 and then out through filtered water outlet 706 being linked and in flow communication therewith.

Figure 13A:
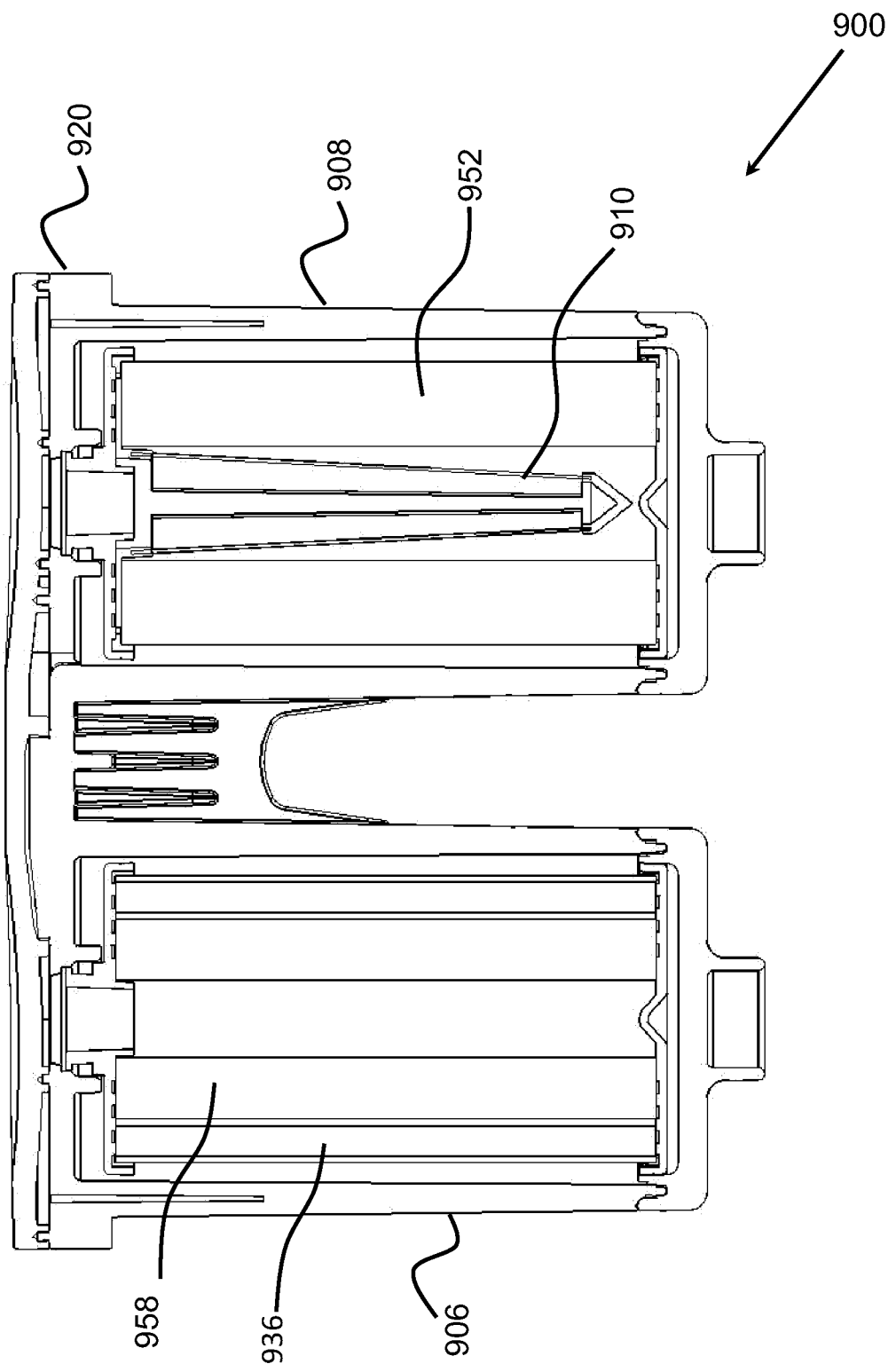
FIG. 13A shows a longitudinal cross-sectional and partial perspective view of a filtering device according to an embodiment of the current disclosure and with the linking member made to be transparent to show internal structure thereof.

FIG. 13A shows a filtering device 900 of another embodiment having two sub-housing structures 906 and 908 and linking element 920, in some similarity to the embodiment shown in FIGS. 1-3. Elements having similar function to the elements of the device of FIGS. 1-3 have been given like reference numeral shifted by 800 and the reader is referred to the description of these figures for explanation of their function. In distinction from the device of FIGS. 1-3, that of FIG. 13A has two treatment modules 912 and 916, shown in details in FIGS. 13B-13D, performing a function somewhat similar to the corresponding modules of FIGS. 1-3.

Figure 13B:
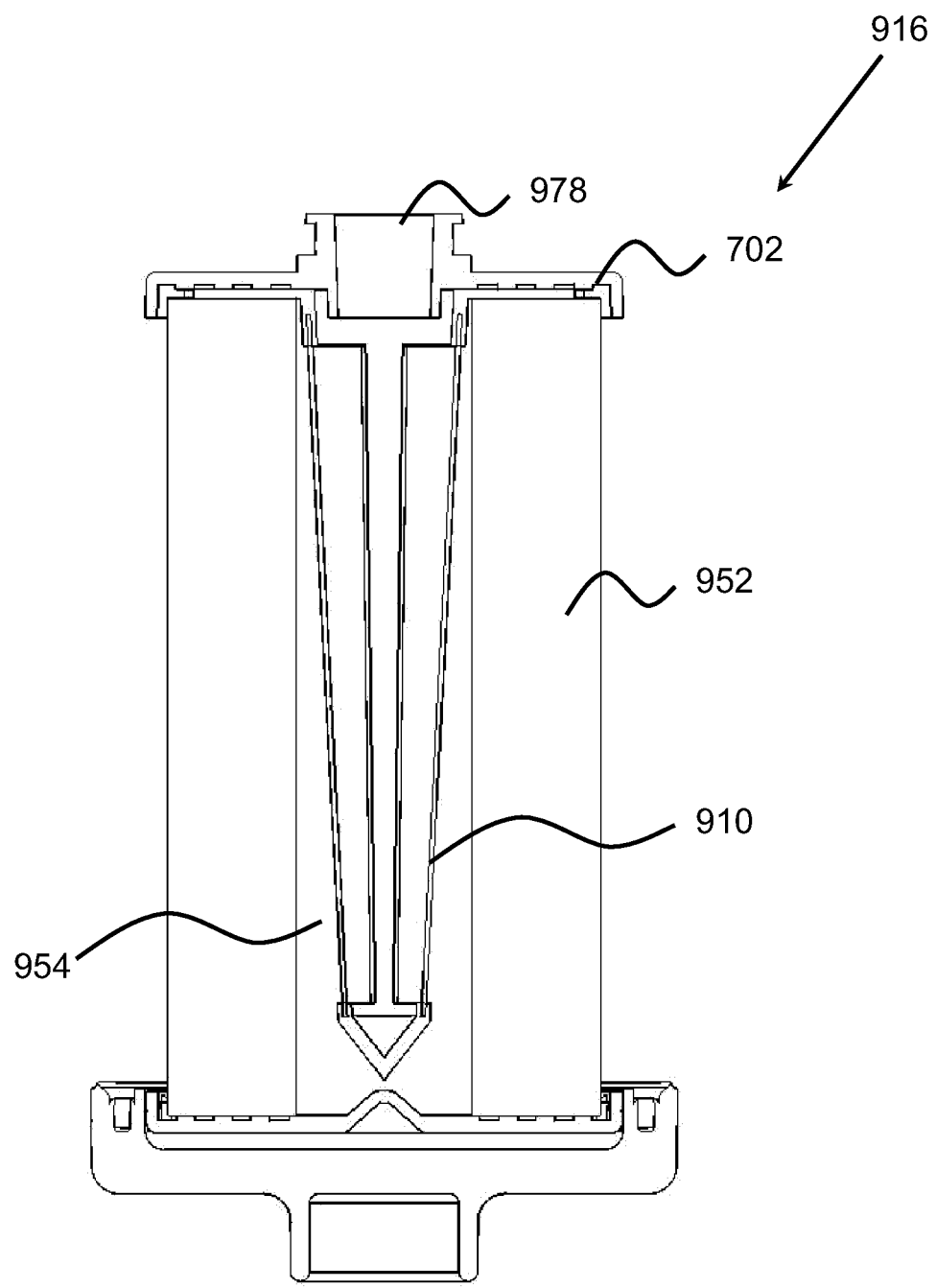
FIGS. 13B and 13C shows the two filtering modules of the filtering device of FIG. 13A in longitudinal cross-sectional view.

As can be seen in FIG. 13B the water treatment element 952, typically solid porous mass made of or comprises activated carbon, is an annular member enveloping a lumen 954 which accommodates a channeling member 910, which is this examples is frustum-conical but may also have other shape, e.g. cylindrical. Member 910 has perforated walls, e.g. a mesh layer, permitting passage of water while filtering-out particulate matter, typically calcium carbonate particles. In addition, member 910 may prevent the accumulation and formation of calcium carbonates sediments within the filtering device, namely member 910 may have anti-scaling function. The channeling member may, by some embodiments, include a water treatment medium, such as a medium that leaches out a substance of nutritional value to the water, a medium with disinfectant properties, etc. As can be seen in FIG. 13A, the module, when in situ is enveloped by an entry space whereby the water and the water flows essentially radially through element 952 to lumen 954 and then through member 910 to egress out of egress 978.

Figure 13C:
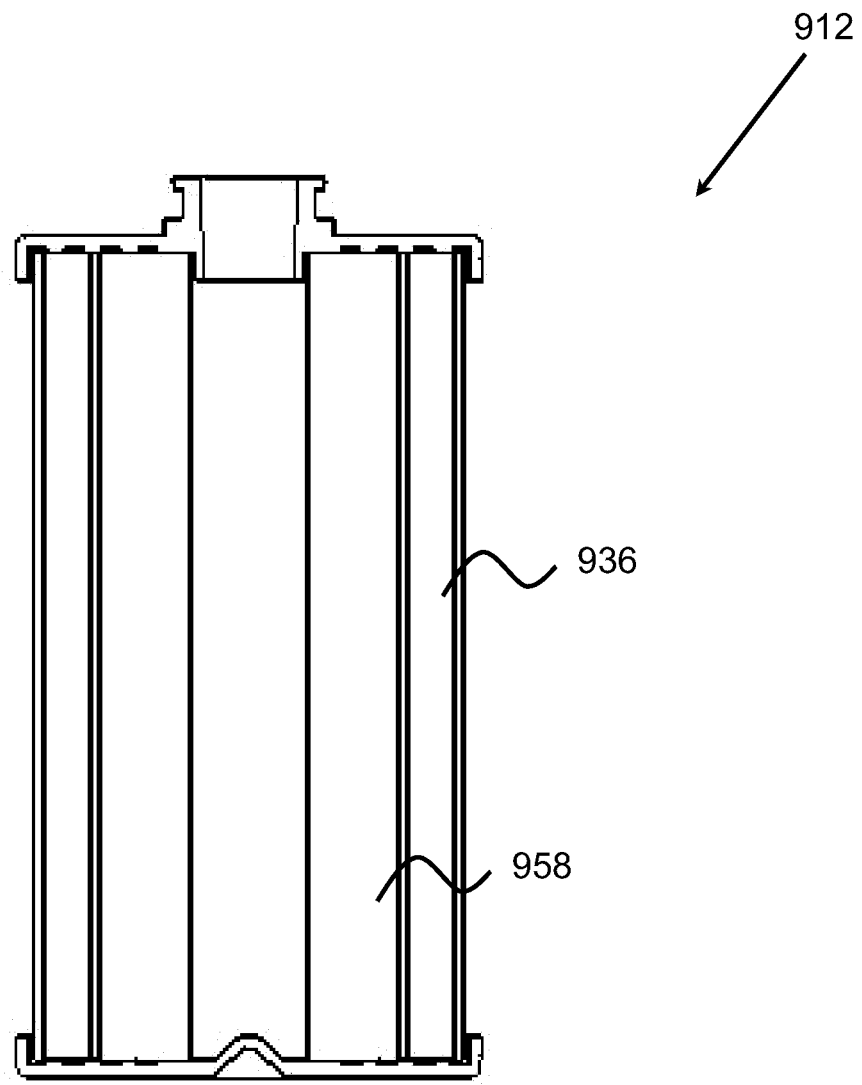
Figure 13D:
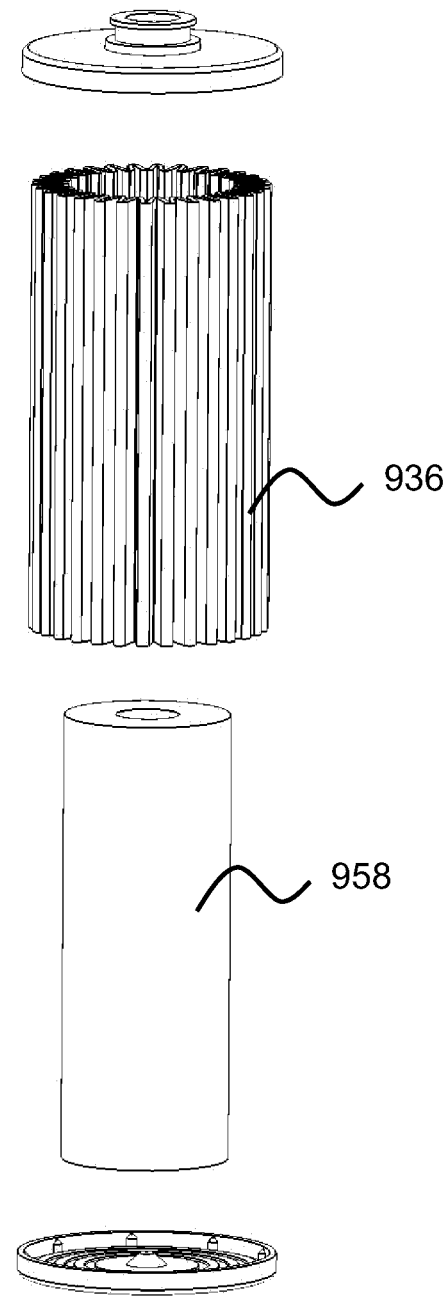
FIG. 13D shows an exploded perspective view of the module of FIG. 13C.

Module 912, seen in FIGS. 13C and 13D, comprises an annular water treatment element 958, which may be the same or different than element 952, and which is enveloped by a pleated filtering sheet 936, which filters out particulate matter and also serves to evenly distribute the radial flow through element 958 along the length of the said element, as described above.

The invention claimed is:

1. A filtering device for filtering running water from a pressurized water source, comprising:
a housing with at least one running water inlet and at least one filtered water outlet;
two or more water treatment modules disposed within the housing, each of which defines a water treatment space that holds at least one water treatment element for either removing a component from or adding a component to the water, and having a water ingress and a water egress, the running water inlet being linked and in flow communication with the water ingress of a first water treatment module, the water egress of a last water treatment module being linked and in flow communication with the filtered water outlet, the water egress of each of the modules other than the last water treatment module being linked and in flow communication with the water ingress of at least one other module, to thereby define a water flow path from the water inlet to the water outlet through a succession of the water treatment modules; and
at least one of the modules (i) defines a curvilinear flow path in its water treatment space by two or more concentric cylindrical wall sections, at least one of the concentric cylindrical wall sections extends into the treatment space from a first wall and at least one other of the concentric cylindrical wall sections extends into the treatment space from an opposite wall, or (ii) comprises a corrugated or pleated filter sheet enveloping or being enveloped by another treatment element,
wherein the modules are pre-assembled, stand-alone modules, the water egress of one or more of the modules being defined within a projection that is adapted to be received into a matching depression formed in another component of the filtering device, and the water ingress of one or more of the modules being formed in a depression adapted to receive a matching projection of another component of the filtering device, to thereby define the flow path.

2. The filtering device of claim 1, wherein the water treatment element comprises at least one component selected from the group consisting of a porous filtering element, a solid body of a filtering medium, an ion-exchange resinous medium, a particulate activated carbon medium, a particulate matter that includes a substance to be released into the water, and combinations thereof.

3. The filtering device of claim 1, wherein each of the modules independently comprises: (i) a single treatment element, or (ii) a combination of different treatment elements.

4. The filtering device of claim 1, wherein
at least one direct flow water treatment module comprises a first water treatment element enveloping a lumen defined by a void within a solid porous filtering mass or by a perforated cylinder and surrounded by the treatment element, the lumen defining an axis;
the first treatment element being enveloped by an entry space linked and in flow communication with the module's water ingress; and
the lumen being linked to the module's water egress;
whereupon water flows in a general radial direction from the entry space to the lumen through the first treatment element.

5. The filtering device of claim 4, wherein the module egress is coaxial with the axis.

6. The filtering device of claim 4, wherein the treatment element is enveloped by a first corrugated or pleated sleeve.

7. The filtering device of claim 4, wherein the lumen comprises a second water treatment element which may be of the same or different substance(s) than that of the first water treatment element.

8. The filtering device of claim 1, wherein one or more modules snap fit into engagement with another module.

9. The filtering device of claim 1, wherein the housing comprises
two or more sub-housing structures, each sub-housing structure housing one or more water treatment modules; and
one or more linking elements connecting the sub-housing structures and having water conduits defined therein to permit water flow between said sub-housing structures along said flow path.

10. The filtering device of claim 9, wherein each of the sub-housing structures is an elongated element and the sub-housing structures being aligned with one another with the linking element being in normal orientation to that of said sub-housing structures.

11. The filtering device of claim 10, wherein the running water inlet and the filtered water outlet are formed within the linking element.

12. The filtering device of claim 1, wherein each water treatment module performs a different water treatment function.

13. The filtering device of claim 4, wherein the perforated cylinder is disposed within a compartment surrounded by the treatment element.

14. The filtering device of claim 1, comprising at least one serpentine flow type water treatment module having a water treatment space formed between two end walls opposite to one another and having a water ingress formed at substantially the center of a first of the two opposite walls; a curvilinear flow path being defined in the water treatment space by two or more concentric cylindrical wall sections, at least one of which extends into the treatment space from the first wall and at least one of which extends into the treatment space from the opposite wall; and the treatment space containing at least one water treatment element.

15. The filtering device of claim 14, wherein the water treatment element comprises at least one component selected from the group consisting of a porous filtering element, an ion-exchange resinous medium, a particulate activated carbon medium, a particulate matter that includes a substance to be released into the water, and combinations thereof.

* * * * *